(12) United States Patent
Imao

(10) Patent No.: US 7,809,966 B2
(45) Date of Patent: Oct. 5, 2010

(54) INFORMATION PROCESSING APPARATUS HAVING A LOW POWER CONSUMPTION STATE AND RELEASING THE LOW POWER CONSUMPTION STATE TO PERFORM COMMUNICATION, AND POWER CONTROL METHOD THEREFOR

(75) Inventor: Eiji Imao, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 592 days.

(21) Appl. No.: 11/615,416

(22) Filed: Dec. 22, 2006

(65) Prior Publication Data

US 2007/0162777 A1    Jul. 12, 2007

(30) Foreign Application Priority Data

Jan. 6, 2006    (JP) ............................. 2006-001375

(51) Int. Cl.
*G06F 1/32* (2006.01)
(52) U.S. Cl. ........................................ 713/320; 713/323
(58) Field of Classification Search ................. 713/320, 713/323
See application file for complete search history.

(56) References Cited

U.S. PATENT DOCUMENTS

| | | | | |
|---|---|---|---|---|
| 5,802,305 A | * | 9/1998 | McKaughan et al. | 709/227 |
| 5,900,026 A | * | 5/1999 | Ryu | 713/320 |
| 6,324,184 B1 | * | 11/2001 | Hou et al. | 370/468 |
| 6,493,780 B2 | * | 12/2002 | Hsu | 710/260 |
| 6,601,180 B1 | * | 7/2003 | Paredes et al. | 713/323 |
| 2002/0083351 A1 | * | 6/2002 | Brabenac | 713/300 |
| 2004/0052347 A1 | * | 3/2004 | Kimura et al. | 379/102.01 |

FOREIGN PATENT DOCUMENTS

JP    2000-011316 A    1/2000

* cited by examiner

*Primary Examiner*—Nitin C Patel
(74) *Attorney, Agent, or Firm*—Canon U.S.A., Inc. I.P. Division

(57) ABSTRACT

An information processing apparatus includes a communication device configured to communicate with a client apparatus via a network, an application system device configured to implement a previously installed application function, and a power controller configured to, if the communication device receives a request for starting a communication performed by the application system device from the client apparatus when the application system device is in a low power consumption state, restore the application system device from the low power consumption state to a normal power consumption state.

9 Claims, 25 Drawing Sheets

FIG.8

| RECEIVING PORT NUMBER *1201* | APPLICATION COMMUNICATION *1202* | PROTOCOL *1203* | POWER SOURCE CONTROL INSTRUCTION CODE *1204* |
|---|---|---|---|
| 21 | TRANSFER OF DATA FILE | FTP | 0×41 |
| 80 | WEB BROWSING TRANSFER OF OPERATION PAGE | HTTP | 0×41 |
| 443 | WEB BROWSING SYSTEM SETTING | HTTPS | 0×43 |
| 5963 | OPERATION COMMAND | UNIQUE PROTOCOL | 0×81 |

| RECEIVING PORT NUMBER | APPLICATION COMMUNICATION | PROTOCOL | POWER SOURCE CONTROL INSTRUCTION CODE | HARDWARE TO BE ACTIVATED |
|---|---|---|---|---|
| 21 | TRANSFER OF PHOTOGRAPHED FILE | FTP | 0x41 | SYSTEM BUS, CPU, RAM, ROM, AND SECONDARY STORAGE DEVICE |
| 80 | OPERATION OF NETWORK CAMERA TRANSFER OF WEB PAGE | HTTP | 0x42 | SYSTEM BUS, CPU, RAM, ROM, AND SECONDARY STORAGE DEVICE |
| 443 | SYSTEM SETTING TRANSFER OF WEB PAGE | HTTPS | 0x42 | SYSTEM BUS, CPU, RAM, ROM, AND SECONDARY STORAGE DEVICE |
| 5963 | STREAMING DISTRIBUTION OF PHOTOGRAPHED VIDEO | UNIQUE PROTOCOL | 0x81 | SYSTEM BUS, CPU, RAM, ROM, IMAGING UNIT, AND ENCODER |
| 8080 | STREAMING DISTRIBUTION OF PHOTOGRAPHED VIDEO | HTTP | 0x81 | SYSTEM BUS, CPU, RAM, ROM, IMAGING UNIT, AND ENCODER |

FIG.19

| RECEIVING PORT NUMBER 1201 | APPLICATION COMMUNICATION 1202 | PROTOCOL 1203 | AUTHENTICATION METHOD 1904 | POWER SOURCE CONTROL INSTRUCTION CODE 1204 |
|---|---|---|---|---|
| 21 | TRANSFER OF DATA FILE | ANONYMOUS FTP | — | 0x41 |
| 990 | TRANSFER OF CONFIDENTIAL DATA FILE | IMPLICIT FTPS | SSL/TLS CLIENT AUTHENTICATION | 0x41 |
| 80 | WEB BROWSING DISPLAY | HTTP | — | 0x41 |
| 443 | WEB BROWSING DISPLAY OF SETTING SCREEN | HTTPS | USER AUTHENTICATION AFTER ENCRYPTED COMMUNICATION IS STARTED | 0x43 |
| 5963 | CONTROL OF APPLICATION APPARATUS | UNIQUE PROTOCOL | SSL/TLS CLIENT AUTHENTICATION | 0x81 |
| 5964 | CONTROL OF APPLICATION APPARATUS | UNIQUE PROTOCOL | SSL/TLS SERVER AUTHENTICATION | 0x81 |

| RECEIVING PORT NUMBER 1201 | APPLICATION COMMUNICATION 1202 | PROTOCOL 1203 | AUTHENTICATION METHOD 1904 | POWER SOURCE CONTROL INSTRUCTION CODE 1204 |
|---|---|---|---|---|
| 21 | TRANSFER OF NORMALLY PHOTOGRAPHED DATA FILE | ANONYMOUS FTP | — | 0x41 |
| 990 | TRANSFER OF CONFIDENTIAL PHOTOGRAPHED DATA FILE | IMPLICIT FTPS | SSL/TLS CLIENT AUTHENTICATION | 0x41 |
| 80 | NETWORK CAMERA GUIDING WEB | HTTP | — | 0x41 |
| 443 | NETWORK CAMERA AUTOMATIC PHOTOGRAPHING SETTING WEB | HTTPS | USER AUTHENTICATION AFTER ENCRYPTED COMMUNICATION IS STARTED | 0x43 |
| 5963 | STREAMING DISTRIBUTION PHOTOGRAPHED VIDEO OPERATION OF REMOTE CAMERA | UNIQUE PROTOCOL | SSL/TLS CLIENT AUTHENTICATION | 0x81 |
| 5964 | STREAMING DISTRIBUTION PHOTOGRAPHED VIDEO OPERATION OF REMOTE CAMERA | UNIQUE PROTOCOL | SSL/TLS SERVER AUTHENTICATION | 0x81 |

2007

INFORMATION PROCESSING APPARATUS HAVING A LOW POWER CONSUMPTION STATE AND RELEASING THE LOW POWER CONSUMPTION STATE TO PERFORM COMMUNICATION, AND POWER CONTROL METHOD THEREFOR

BACKGROUND OF THE INVENTION

1. Field of the Invention

The present invention relates to an information processing apparatus having a communication function and a power control method therefor.

2. Description of the Related Art

Conventionally, in an information processing apparatus, power saving is implemented by powering off most units and or functions of the information processing apparatus while no communication is being performed. In performing communication, the information processing apparatus is powered on via a network, for example. Such information processing apparatus is typically capable of performing an application communication using TCP/IP protocol as a lower layer protocol via a network.

The method of saving power in a personal computer (PC) connected to a local area network (LAN) includes the following methods. During power saving, a personal computer (PC) powers off a main device such as a central processing unit (CPU) and a hard disk. The PC then activates only a network interface controller (NIC) which is directly connected to a network for controlling communication. In addition, during power saving, the NIC checks if a data segment received from the network includes a specific data string. If a data segment including the specific data string is received, the NIC performs control to activate the main device of the PC.

The aforementioned method is generally called a "Wake-On-LAN (WOL)". A representative example of application of the WOL to a PC includes "Magic Packet®". Referring to FIG. 1, a data string 201 indicates the format of a specific data string in Magic Packet®. With the use of Magic Packet®, the NIC activates the main device when receiving the data string 201, which includes data 202 having a six-time repeated hexadecimal number "FF..." followed by data 203 having a sixteen-time repeated media access control (MAC) address.

Referring to FIG. 2, a data string 301 indicates an example of Magic Packet® using a User Datagram Protocol/Internet Protocol (UDP/IP) packet. The data string 301 includes an IP header 302, a UDP header 303, and a data string 304, which is a specific data string in Magic Packet®, as a packet payload (data body).

Furthermore, Japanese Patent Application Laid-Open No. 2000-11316 discusses a method for powering on an application apparatus via a network to activate the application apparatus.

However, in the case of WOL, it is necessary that an apparatus that activates an information processing apparatus via a network includes a function for producing a data segment including a specific data string. Accordingly, apparatuses that are capable of remotely activating an information processing apparatus are limited. For example, in the case of Magic Packet®, an apparatus that remotely activates an information processing apparatus needs to previously store a MAC address of the information processing apparatus to be remotely activated.

In addition, an apparatus that remotely activates an information processing apparatus needs to have a function for producing a sending data segment having a data format such as the one indicated by the data string 201 in FIG. 1.

Moreover, in the case of WOL, an apparatus that activates an information processing apparatus needs to perform a communication while determining whether the information processing apparatus is in a normal operation mode (normal power consumption state) or in a low power consumption state.

Therefore, it would be desirable to provide an information processing apparatus capable of saving power consumption and safely performing restoration from a low power consumption state according to a request from another apparatus connected thereto via a network, with a simple configuration.

SUMMARY OF THE INVENTION

The present invention is directed to an information processing apparatus capable of saving power consumption and safely performing restoration from a low power consumption state according to a request from another apparatus connected thereto via a network, with a simple configuration.

According to an aspect of the present invention, an information processing apparatus includes a communication device configured to communicate with a client apparatus via a network, an application system device configured to implement a previously installed application function, and a power controller configured to, if the communication device receives a request for starting a communication performed by the application system device from the client apparatus when the application system device is in a low power consumption state, restore the application system device from the low power consumption state to a normal power consumption state.

According to another aspect of the present invention, the communication device includes a memory storing setting information that associates a port number and a type of communication performed by the application system device, wherein the power controller determines whether the request for starting a communication from the client apparatus is a request for starting a communication performed by the application system device based on the setting information and the port number of a port receiving the request for starting a communication performed by the application system device from the client apparatus.

According to yet another aspect of the present invention, the setting information may further include activation target information on hardware devices included in the application system device, wherein the power controller determines a hardware device to be activated included in the application system device based on the setting information and the port number of a port receiving the request for starting a communication performed by the application system device from the client apparatus.

Moreover, according to another aspect of the present invention, after authentication is successfully performed according to an authentication method corresponding to the request for starting a communication, the power controller restores the application system device from the low power consumption state to the normal power consumption state.

Additionally, according to another aspect of the present invention, the setting information may further include authentication method information about an authentication method, wherein the power controller determines an authentication method based on the authentication method information and the port number of a port receiving the request for starting a communication performed by the application system device from the client apparatus.

Also, according to yet another aspect of the present invention, the application system device may include a hardware device configured to control a camera.

And, according to another aspect of the present invention, a power state restoration method is provided for an information processing apparatus including a communication device configured to perform a communication with a client apparatus via a network and an application system device configured to implement a previously installed application function. Here, the method includes, when the application system device is in a low power consumption state, receiving a request for starting a communication performed by the application system device from the client apparatus; and responsive to receiving the request for starting a communication, restoring the application system device from the low power consumption state to a normal power consumption state.

Furthermore, according to another aspect of the present invention, after authentication is successfully performed according to an authentication method corresponding to the request for starting a communication, restoring the application system device from the low power consumption state to the normal power consumption state. And also, according to another aspect of the present invention, the application system device may include a hardware device configured to control a camera.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of association data according to an exemplary embodiment of the present invention.

FIG. 15 illustrates an example of association data according to an exemplary embodiment of the present invention.

FIG. 19 illustrates an example of association data according to an exemplary embodiment of the present invention.

FIG. 28 illustrates an example of association data according to an exemplary embodiment of the present invention.

DETAILED DESCRIPTION OF THE EMBODIMENTS

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

First Exemplary Embodiment

Figure 1:
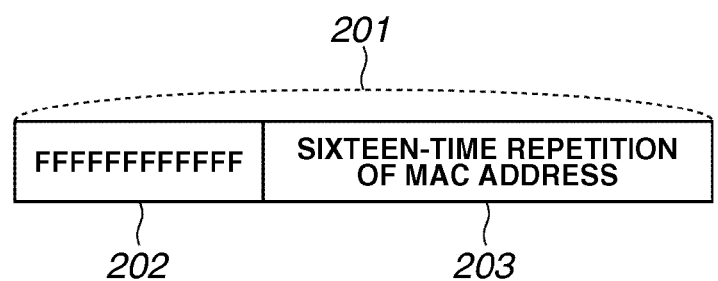
FIG. 1 illustrates a format of a specific data string in Magic Packet®.
Figure 2:
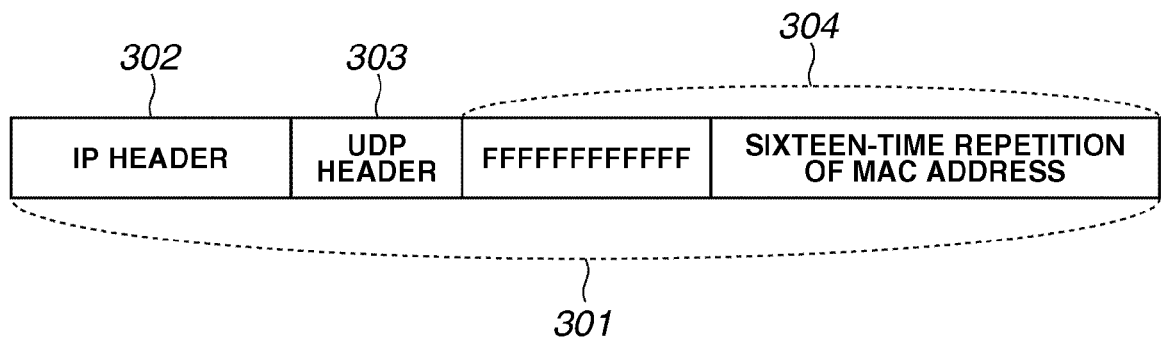
FIG. 2 illustrates a UDP/IP packet in Magic Packet®.
Figure 3:
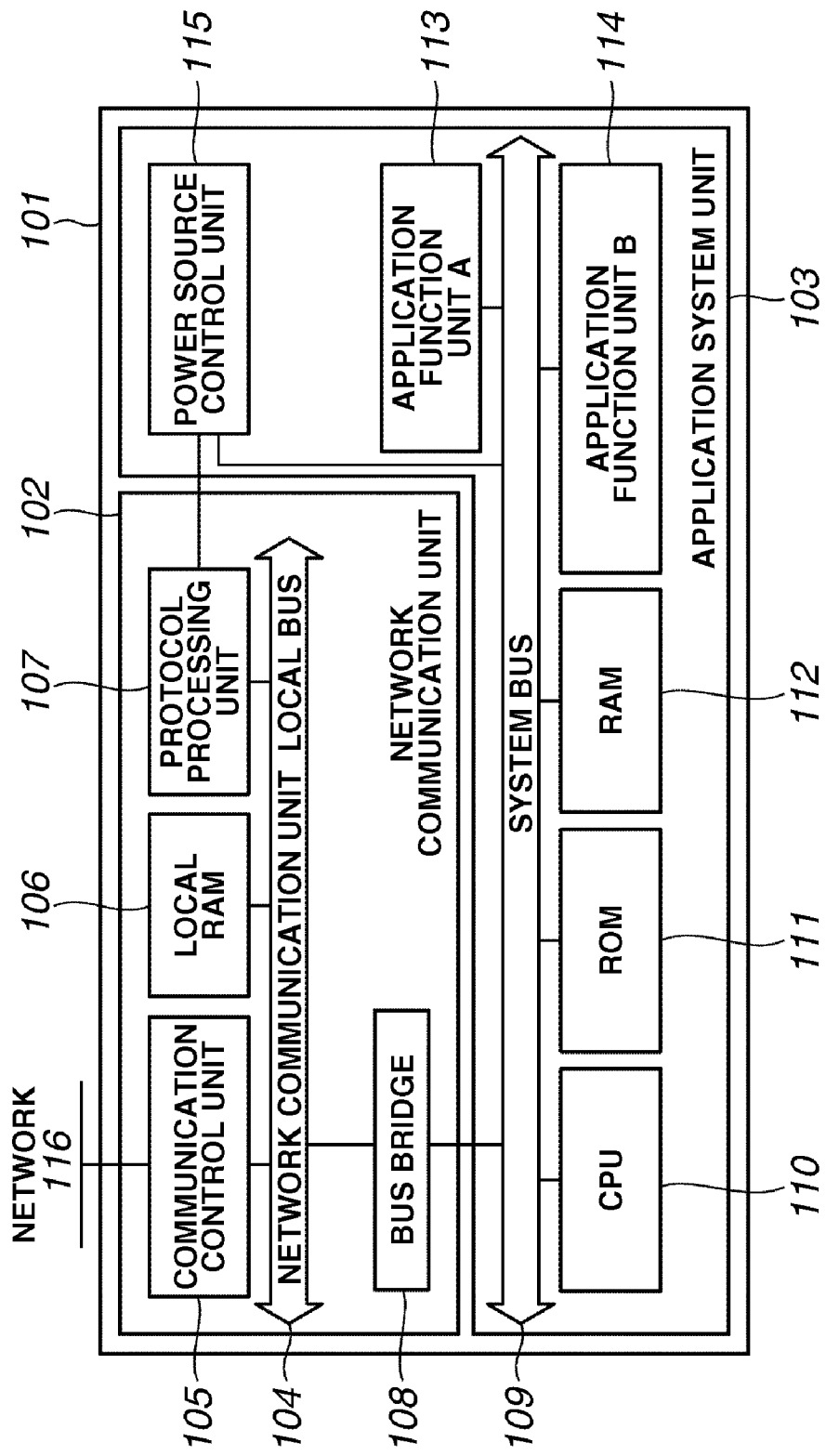
FIG. 3 illustrates an example of an information processing apparatus according to an exemplary embodiment of the present invention.

FIG. 3 illustrates an example of an information processing apparatus according to an exemplary embodiment of the present invention. With regard to the present invention, the information processing apparatus is defined as an apparatus that is capable of performing an application communication using a Transmission Control Protocol/Internet Protocol (TCP/IP) as a lower layer protocol via a network.

Referring to FIG. 3, an information processing apparatus 101 includes, as a hardware configuration of the information processing apparatus 101, a network communication unit 102 and an application system unit 103.

A communication control unit 105, a local random access memory (RAM) 106, and a protocol processing unit 107 are connected to a local bus 104 of the network communication unit 102. For a network 116, Ethernet® can be used, for example. In addition, a wireless network and an optical fiber network can be used for the network 116. In addition, an application communication can be performed by a user terminal via the network 116 using a TCP/IP protocol from a location distant from a location in which the information processing apparatus 101 is positioned.

The communication control unit 105 is a control circuit that sends and receives a transmission frame to and from the network 116. In the case where the network 116 is Ethernet®, for example, the communication control unit 105 performs MAC processing (transmission medium control processing) in Ethernet® and sends and receives an Ethernet® frame.

The protocol processing unit 107 is a hardware circuit apparatus dedicated to processing of a communication protocol or is a microprocessor designed for processing a communication protocol. The protocol processing unit 107 performs communication processing of a general-purpose TCP/IP protocol. More specifically, the protocol processing unit 107 performs processing of various communication protocols, such as Internet Protocol version 4 (IPv4), Internet Protocol version 6 (IPv6), Internet Control Message Protocol (ICMP), User Datagram Protocol (UDP), and TCP, a transmission flow control, a congestion control, and a communication error control.

In addition, the protocol processing unit 107 is connected to a power source control unit 115 via a control signal line so as to control an operation of the power source control unit 115. The local RAM 106 is used as a temporary storage area for data in processing by the communication control unit 105 and the protocol processing unit 107.

In addition, the network communication unit 102 includes a bus bridge circuit 108 that enables a data transport between the local bus 104 and a system bus 109 of the application system unit 103. That is, a bus circuit of the network communication unit 102 and a bus circuit of the application system unit 103 are connected with each other. Thus, communication data is transferred via each bus.

A central processing unit (CPU) 110, a read-only memory (ROM) 111 that stores a system program, and a random access memory (RAM) 112, which is a temporary storage device for use in executing the system program, are connected to the system bus 109 of the application system unit 103. The system program is read from the ROM 111 to the RAM 112 so as to be executed by the CPU 110

In addition, each of an application function unit A 113 and an application function unit B 114, which are connected to the system bus 109, is a hardware processing apparatus used for implementing an application function characteristic to the information processing apparatus 101.

The power source control unit 115 is configured to separately and independently control supply of power to each of the network communication unit 102 and the application system unit 103. The power source control unit 115, with respect to each device of the system bus 109, the CPU 110, the ROM 111, the RAM 112, the application function unit A 113, and the application function unit B 114, performs control of turning on/off of power, control of resetting a hardware, and control of termination processing for safely powering off the whole application system unit 103 without damaging stored data.

The CPU 110 controls functions of each device of the information processing apparatus 101 and performs application processing according to the system program. The RAM 112 is used as a temporary storage area at the time of execution of a program by the CPU 110 and as an input/output data area used by the network communication unit 102, the application function unit A 113, and the application function unit B 114.

An application function of the information processing apparatus 101 is implemented by the application system unit 103. In addition, by using the system program executed by the CPU 110, an application communication, which is a part of the application function, is performed. The application communication is a TCP/IP-based communication. TCP/IP protocol processing is performed by the network communication unit 102.

Figure 4:
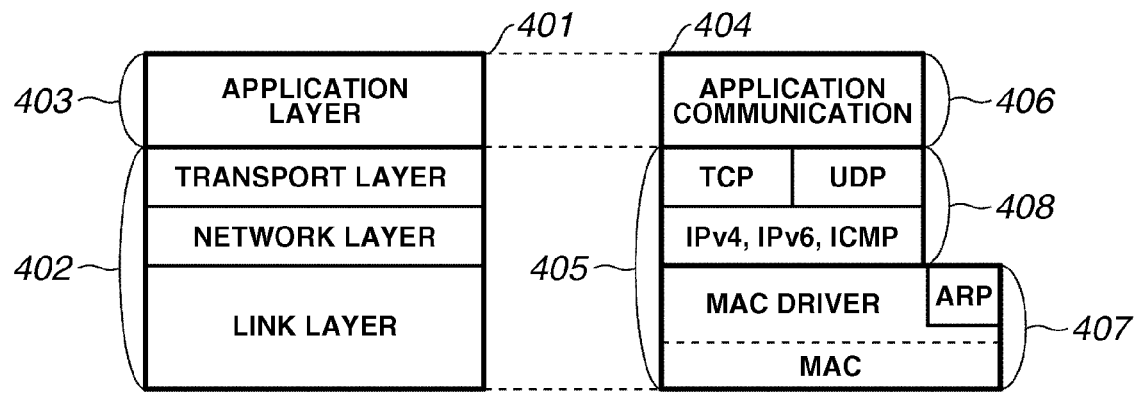
FIG. 4 illustrates example sharing of functions for communication processing according to an aspect of the present invention.

Sharing of functions for communication processing is described below with reference to FIG. 4. Referring to FIG. 4, a TCP/IP hierarchical model 401 includes four layers, namely, in order from a lower layer to an upper layer, a link layer, a network layer, a transport layer, and an application layer. A protocol in the link layer is a communication protocol in a physical network such as Ethernet® in a common wired LAN and a wireless LAN that is standardized by IEEE802.11b/a/g. For protocols in the network layer, there are IPv4, IPv6, ICMP, and Internet Gateway Multicast Protocol (IGMP). For protocols in the transport layer, there are UDP and TCP. For protocols in the application layer, there are Hypertext Transfer Protocol (HTTP), File Transfer Protocol (FTP), Simple Mail Transfer Protocol (SMTP), Real Time Transport Protocol (RTP), and RTP Control Protocol (RTCP). In addition, in TCP/IP, a communication using a uniquely-defined application layer protocol is often performed.

The network communication unit 102 performs processing of protocols in a layer range 402 including the data link layer, the network layer, and the transport layer. In addition, in the application communication performed by the application system unit 103, processing of a protocol in a layer range 403 including the application layer is performed.

A hierarchical model 404 shown in FIG. 4 indicates communication processing performed by the information processing apparatus 101, which is associated with the communication processing in the TCP/IP hierarchical model 401.

The processing performed by the network communication unit 102 is indicated by a range 405.

The following three processings indicated by a range 407 among the processings indicated by the range 405 are performed by the communication control unit 105.

(i) Transmission control processing with respect to a physical medium on the network 116, as a medium access controller (MAC)

(ii) Processing of a MAC driver that performs control of a MAC (iii) Processing of Address Resolution Protocol (ARP), which is a protocol for resolving a linkage between an IP address and a MAC address In addition, processing of the protocols in the network layer indicated by a range 408, namely, IPv4, IPv6, and ICMP, and processing of the protocols in the transport layer, namely, UDP and TCP, are performed by the protocol processing unit 107.

The application system unit 103 performs processing indicated by a range 406. That is, the application system unit 103 performs processing for all the protocols in the application layer that are used in the application communication by the information processing apparatus 101.

As shown in shared processing of a TCP/IP communication indicated by the hierarchical model 404, the application communication by the information processing apparatus 101 is implemented by the application system unit 103 utilizing a communication function of the network communication unit 102.

In the configuration as described above, in a state where the information processing apparatus 101 is performing communication using a protocol in the application layer, at least the network communication unit 102, the system bus 109, the CPU 110, the ROM 111, the RAM 112, and the power source control unit 115 are operating. Hereinafter, a state of power consumption in this state is referred to as a "normal power consumption state". In the normal power consumption state, when the application function unit A 113 and the application function unit B 114 which are other devices within the application system unit 103 operate, an amount of power consumption increases. On the other hand, when the application function unit A 113 and the application function unit B 114 do not operate, an amount of power consumption is suppressed. As described above, the control of power supply to the hardware devices in the application system unit 103, namely, the system bus 109, the CPU 110, the ROM 111, the RAM 112, the application function unit A 113, and the application function unit B 114, is performed by the power source control unit 115.

On the other hand, during a time period in which no application communication is performed, the power source control unit 115 powers off the hardware devices, such as the system bus 109, the CPU 110, the ROM 111, the RAM 112, the application function unit A 113, and the application function unit B 114, within the application system unit 103 to terminate the operation of the hardware devices. The information processing apparatus 101 operates the network communication unit 102 and the power source control unit 115 only. In this manner, the information processing apparatus 101 shifts to a low power consumption state in which an amount of power consumption is considerably decreased.

Figure 5:
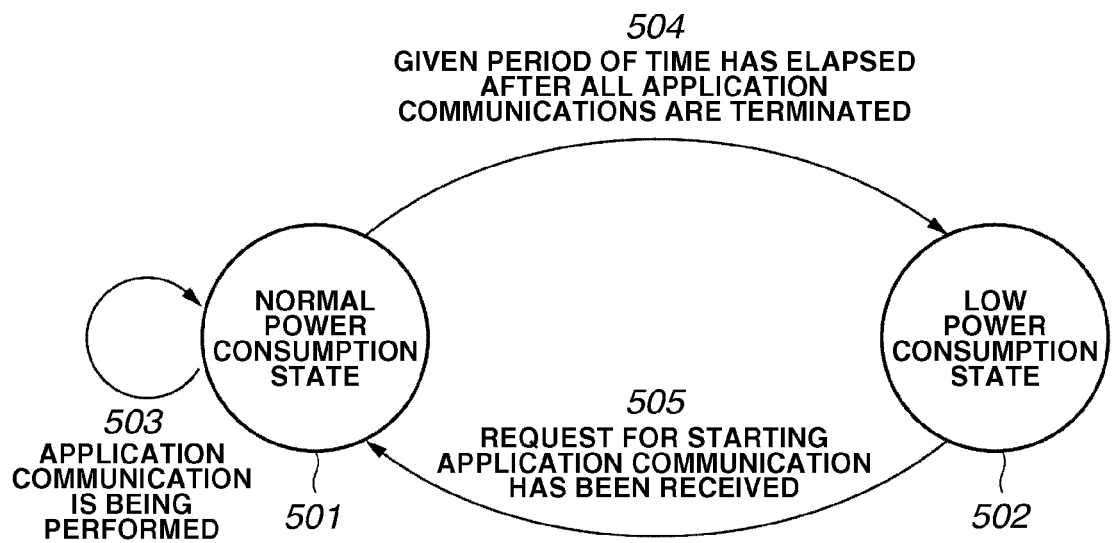
FIG. 5 illustrates an exemplary transition of states between a normal power consumption state and a low power consumption state of an information processing apparatus according to an exemplary embodiment of the present invention.

FIG. 5 illustrates a transition of states between the normal power consumption state and the low power consumption state of the information processing apparatus 101. A state 501 indicates a normal power consumption state and a state 502 indicates a low power consumption state. In the normal power consumption state 501, in a state 503 where an application communication is being performed, the normal power consumption state is maintained.

When a given period of time that is previously set to the ROM 111 of the information processing apparatus 101 has elapsed after all the application communications are completed (a state 504), the information processing apparatus 101 shifts to the low power consumption state 502. Alternatively, in a case where no application communication is performed within a given period of time that is set to the ROM 111 after an initial activation processing, by which the information processing apparatus 101 is powered on for the first time, is performed, the information processing apparatus 101 shifts to the low power consumption state 502.

On the other hand, in the low power consumption state 502, in a state 505 where the information processing apparatus 101 receives a request from a user for starting an application communication, the information processing apparatus 101 shifts to the normal power consumption state 501.

Now, an operation of the information processing apparatus 101 when the information processing apparatus 101, in a low power consumption state, receives a request for starting an application communication from a client apparatus via the network 116 is described below with reference to FIG. 6.

Figure 6:
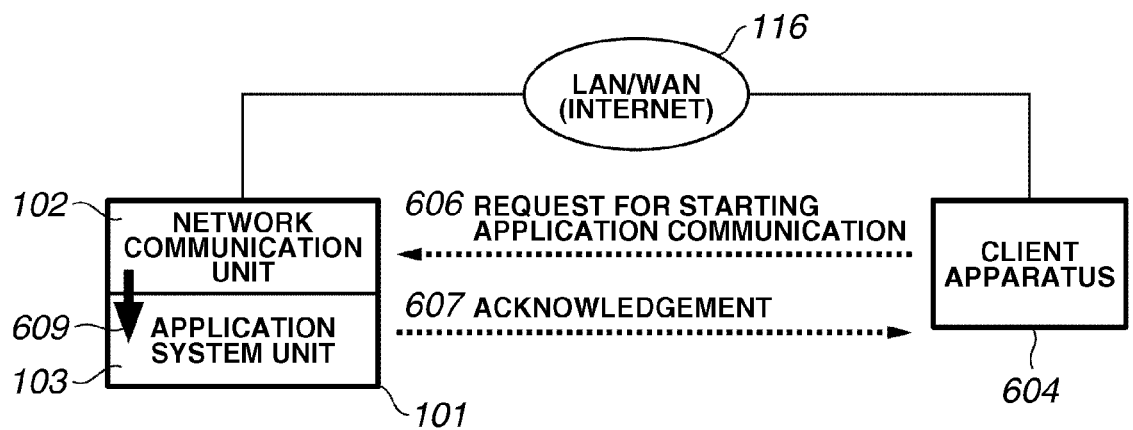
FIG. 6 illustrates an exemplary operation of the information processing apparatus when the information processing apparatus, in a low power consumption state, receives a request for starting an application communication from a client apparatus according to an exemplary embodiment of the present invention.

Referring to FIG. 6, the network 116 exists between the information processing apparatus 101 and a client apparatus 604. The network 116 can be a LAN or a network including a plurality of LANs mutually connected by a wide area network (WAN). The network 116 can be a path through the Internet.

The client apparatus 604, which is operated by a user, sends an application communication start request signal 606 to the information processing apparatus 101. Then, the network communication unit 102 of the information processing apparatus 101 receives the application communication start request signal 606. The network communication unit 102, when receiving the application communication start request signal 606, sends an acknowledgement signal 607 to the client apparatus 604 and generates an instruction for powering on the application system unit 103 to the power source control unit 115 (an operation 609 in FIG. 6).

Now, a description is made as to communication processing by the network communication unit 102 in a low power consumption state of the information processing apparatus 101. The network communication unit 102 neither actively sends a frame to the network 116 nor performs a communication with the network 116. That is, the network communication unit 102 performs receiving processing of a data frame that is transmitted through the network 116 and sends the frame on a need basis.

Hereinbelow, a description is made as to an example in which the network 116 is Ethernet®. The communication control unit 105 receives a frame, among frames transmitted through the network 116 (Ethernet®), whose destination address is a MAC address of the information processing apparatus 101 or a broadcast address only, so as to write the frame into the local RAM 106. After that, the communication control unit 105 analyzes a frame header of the received frame and checks a communication protocol of data stored in the received frame.

Figure 7:
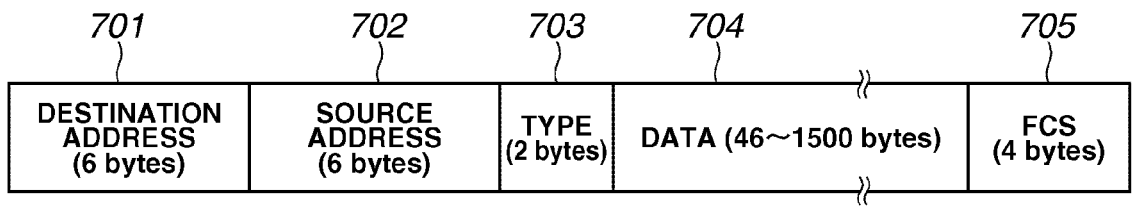
FIG. 7 illustrates an exemplary format of a data frame in a communication using Ethernet® protocol.

FIG. 7 illustrates a format of a data frame in a communication using an Ethernet® protocol. The data frame includes a destination address 701, a source address 702, a type identifier (ID) 703 for discriminating an upper layer protocol, a data body 704, and a Frame Check Sequence (FCS) 705. For the type ID 703, a value "0x0800" is set when the data body 704 is an IP packet, and a value "0x0806" is set when the data body 704 is an ARP protocol packet.

An end portion of a frame stores a 4-byte FCS 705. The FCS 705 is a Cyclic Redundancy Check (CRC) code that is provided in order to determine whether a bit error occurs in portions from the destination address 701 to the data body 704.

Accordingly, the communication control unit 105 analyzes a header of the received frame. If a value "0x0800" is set to a type field of an Ethernet® header indicated by the type ID 703, which indicates that an IP protocol packet is received, then the communication control unit 105 causes the protocol processing unit 107 to start receiving processing. If a value "0x0806" is set to a type field of an Ethernet® header indicated by the type ID 703, which indicates that an ARP protocol packet is received, then the communication control unit 105 analyzes the received ARP packet.

When the communication control unit 105 receives an ARP packet, if the received ARP packet is an ARP request inquiring a MAC address that corresponds to an IP address of the information processing apparatus 101, the communication control unit 105 performs the following processing. That is, the communication control unit 105 produces an ARP reply packet and sends the ARP reply packet through the network 116 so as to send a MAC address of the information processing apparatus 101 to a source of the ARP request. On the other hand, if the ARP packet is not an ARP request that inquires a MAC address corresponding to an IP address of the information processing apparatus 101, the communication control unit 105 discards the ARP packet and performs no processing.

Now, a description is made as to processing performed by the protocol processing unit 107 when the information processing apparatus 101 is in a low power consumption state. The frame data received by the communication control unit 105 is stored in the local RAM 106. In addition, if it is determined that the received frame data includes an IP packet, the protocol processing unit 107 receives a notification instructing a start of processing from the communication control unit 105 and starts the following processing.

When the received IP packet is a request for starting an application communication in the application layer, the protocol processing unit 107 issues a power source control instruction and restores the network communication unit 102 from a low power consumption state so that the application communication can be started.

When the frame data received through the network 116 satisfies all of the following three conditions 1 through 3, the protocol processing unit 107 determines that the frame data is a request for starting an application communication provided by the information processing apparatus 101.

Condition 1: The frame data is a TCP packet addressed to the information processing apparatus 101.
Condition 2: The frame data is a TCP packet requesting a start of a TCP connection.
Condition 3: A destination port number of the TCP packet is the same as a receiving port number for an application communication.

In addition, the protocol processing unit 107, according to the destination port number, determines of which application communication provided by the information processing apparatus 101 the TCP packet requests a start.

In addition, the protocol processing unit 107 issues a power source control instruction to the power source control unit 115 so as to power on the devices within the application system unit 103 that need to be activated to perform an application communication when the information processing apparatus 101 is in a low power consumption state.

In order to perform this processing, the protocol processing unit 107 stores, in the local RAM 106, association data containing an application communication, a receiving TCP port number, and a power source control instruction code issued to the power source control unit 115. FIG. 8 illustrates an example of the association data.

Referring to FIG. 8, an item 1201 indicates a receiving TCP port number. An item 1202 indicates a content of an application communication corresponding to the TCP port number. An item 1203 indicates a name of an application protocol in an application communication. An item 1204 indicates a power source control instruction code issued to the power source control unit 115.

In a table 1205, for example, in a specific field of the table 1205, the TCP port number that the information processing apparatus 101 receives is "80" and a content of the application communication includes a transfer of operation page data for web browsing by the information processing apparatus 101. In addition, it is indicated that the protocol used for the application communication is an HTTP protocol. In addition, it is indicated that the protocol processing unit 107 sets a power source control instruction code "0x41" to the power source control unit 115 when the information processing apparatus 101 is activated from a low power consumption state by the application communication.

Figure 9:
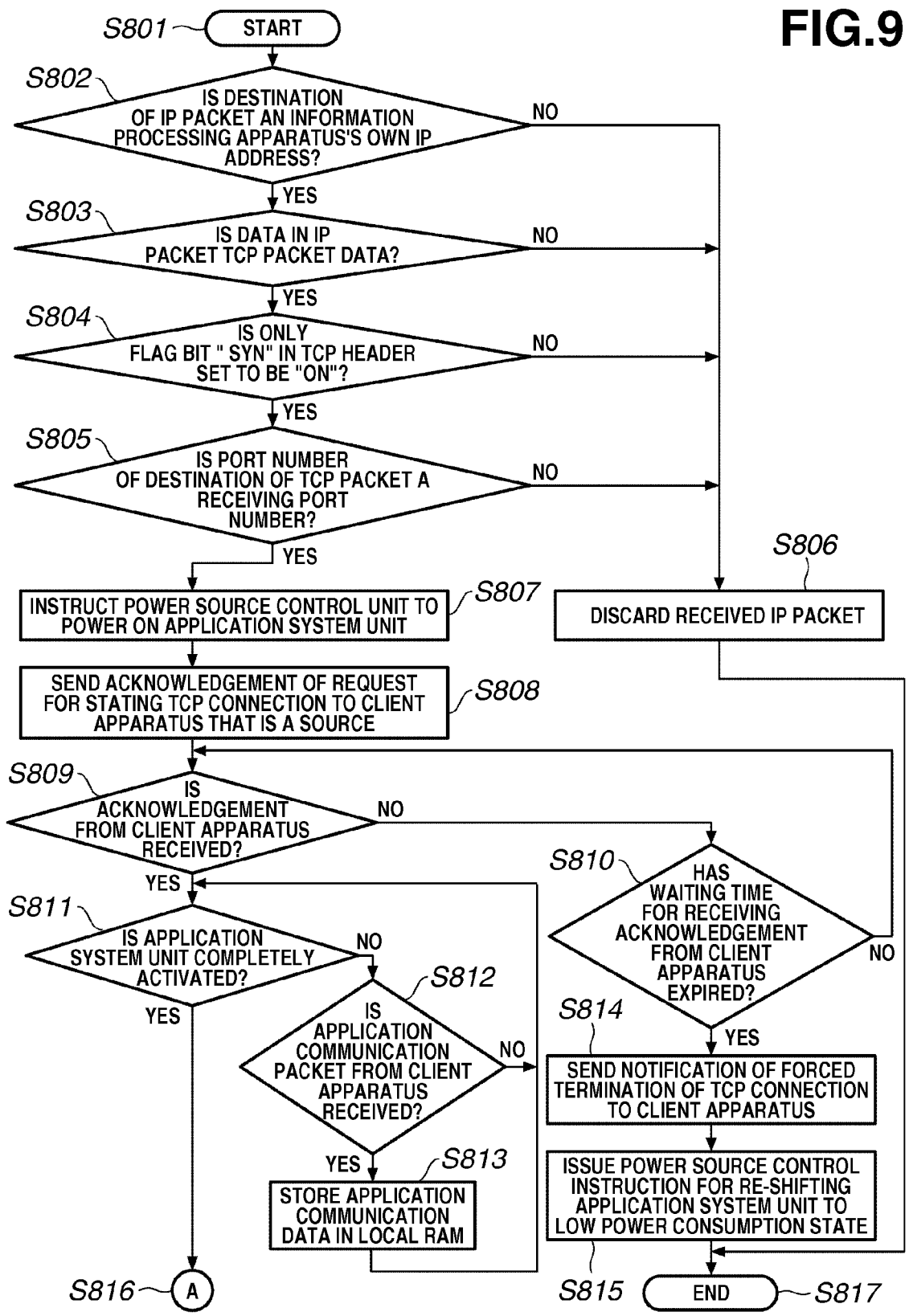
FIG. 9 is a flow chart that illustrates an example of processing performed by a protocol processing unit when the information processing apparatus is in a low power consumption state according to an exemplary embodiment of the present invention.
Figure 10:
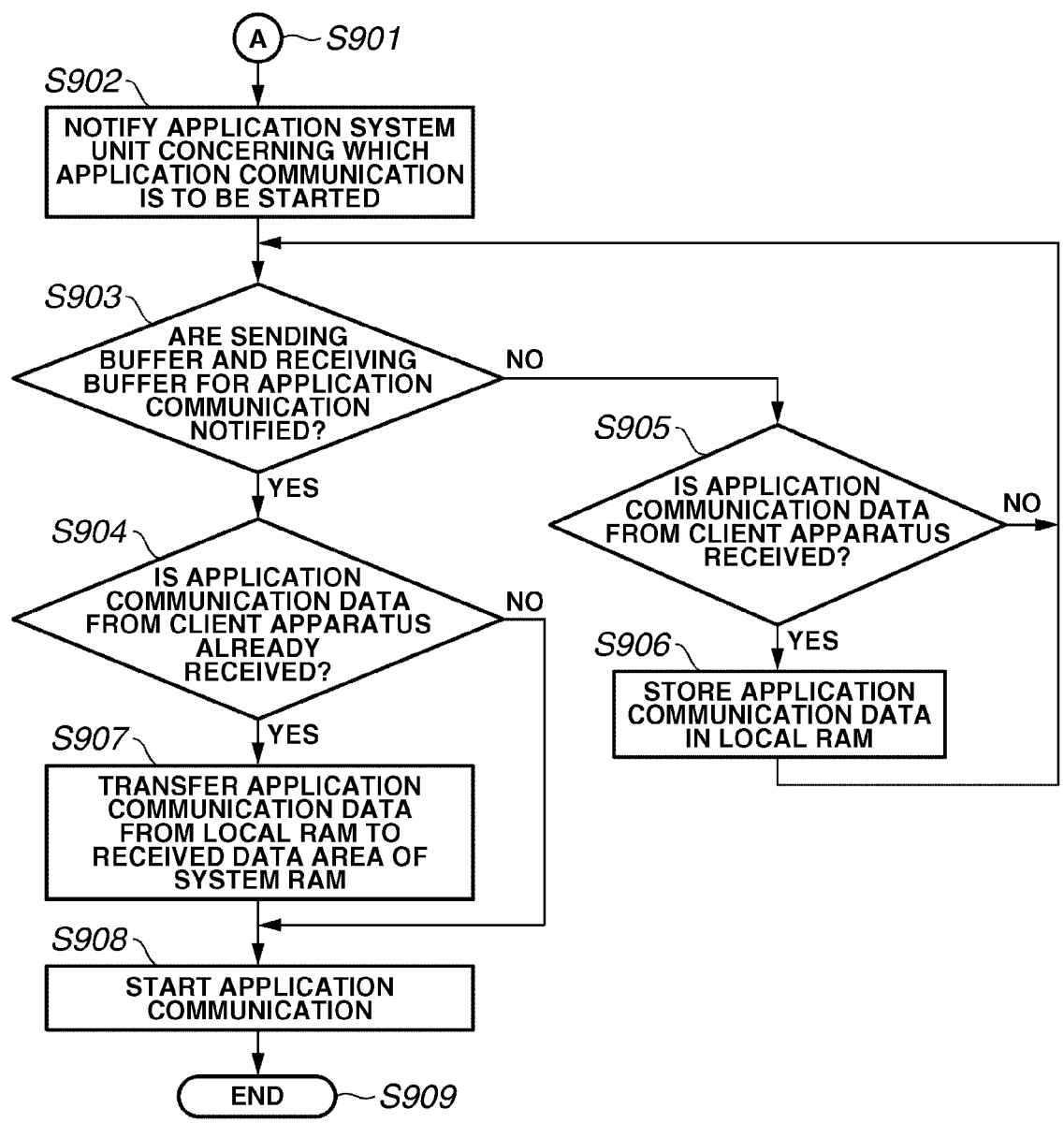
FIG. 10 is a flow chart that illustrates an example of processing performed by the protocol processing unit when the information processing apparatus is in a low power consumption state according to an exemplary embodiment of the present invention.
Figure 11:
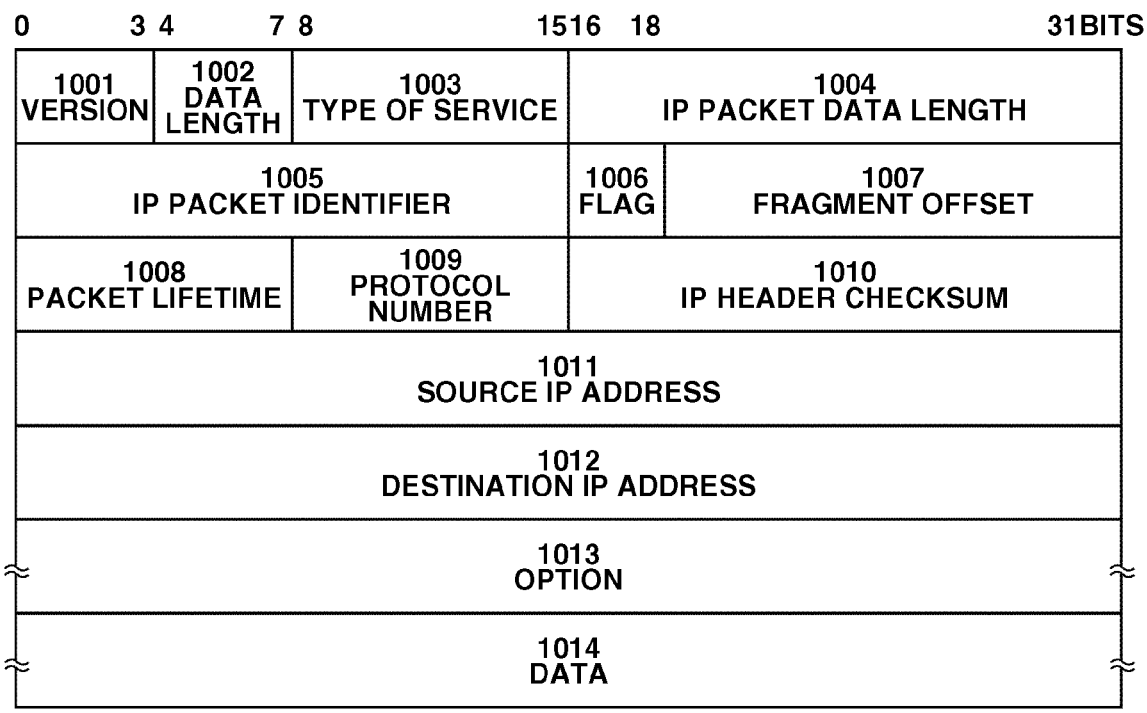
FIG. 11 illustrates an example packet data format of an IP packet.
Figure 12:
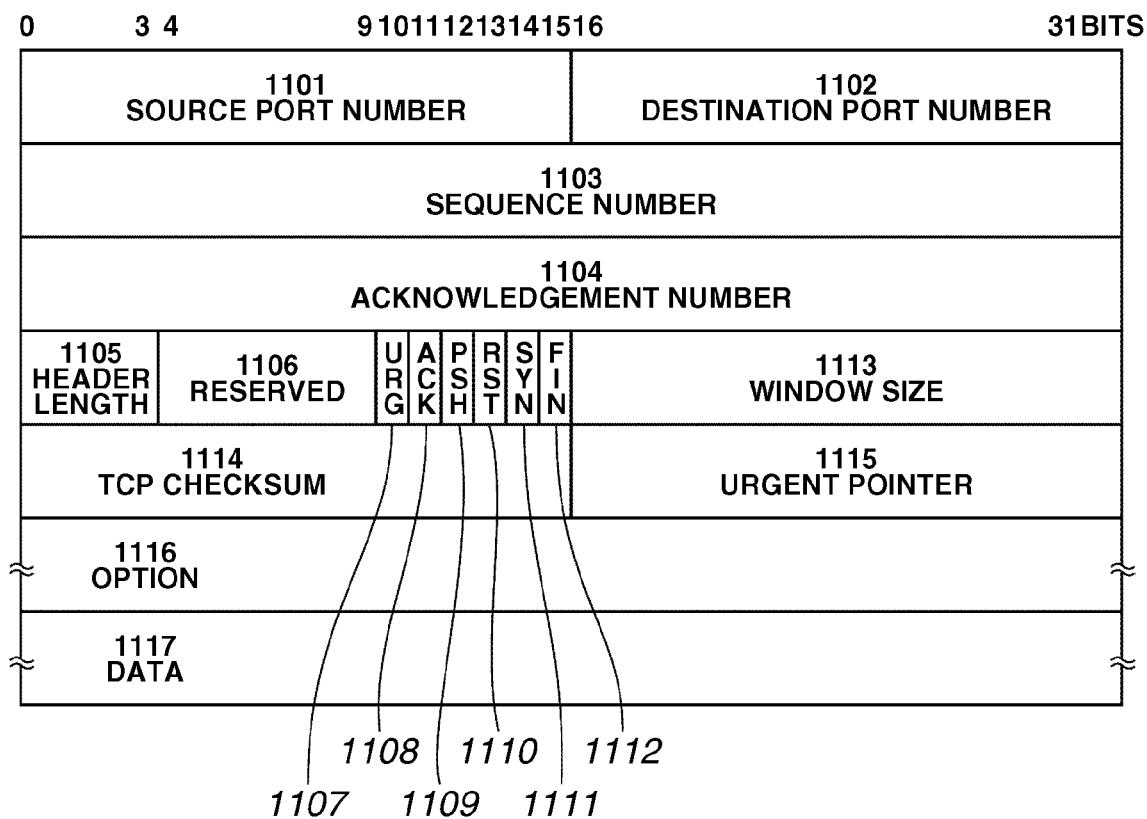
FIG. 12 illustrates an example data format of a TCP packet.

Now, a description is made as to exemplary processing performed by the protocol processing unit 107 when the information processing apparatus 101 is in a low power consumption state, with reference to FIG. 9, FIG. 10, FIG. 11, and FIG. 12. Each of FIG. 9 and FIG. 10 is a flow chart that illustrates processing performed by the protocol processing unit 107 when the information processing apparatus 101 is in a low power consumption state. FIG. 11 illustrates a packet data format of an IP packet. FIG. 12 illustrates a data format of a TCP packet.

The processing by the protocol processing unit 107 starts with step S801 in FIG. 9. In step S802, the protocol processing unit 107 analyzes a header of the received IP packet. Thus, the protocol processing unit 107 checks whether a destination IP address matches an IP address set to the information processing apparatus 101.

If it is determined that the destination IP address does not match the IP address set to the information processing apparatus 101 or in the case of a broadcast IP packet, for example, the protocol processing unit 107 advances to step S806. In step S806, the protocol processing unit 107 discards the received IP packet and the processing ends.

Here, an IP packet has a format shown in FIG. 11. The protocol processing unit 107 confirms a destination IP address of the received packet by checking a field 1012. If it is determined that the destination IP address matches the IP address set to the information processing apparatus 101, the protocol processing unit 107 advances to step S803. In step S803, the protocol processing unit 107 determines whether data of the received IP packet is a TCP packet.

The protocol processing unit 107 determines whether data of the IP packet is a TCP packet by checking a value for the received IP packet indicated in a field 1009 in FIG. 11. In the present exemplary embodiment, if a value in the field 1009 in FIG. 11 is "6", the protocol processing unit 107 determines that the data of the IP packet is a TCP packet.

In step S803, if it is determined that that the data of the IP packet is a TCP packet, the protocol processing unit 107 advances to step S804. On the other hand, if it is determined that that the data of the IP packet is not a TCP packet, the protocol processing unit 107 advances to step S806. In step S806, the protocol processing unit 107 discards the received IP packet, and the processing ends.

In step S804, the protocol processing unit 107 analyzes a TCP header of the TCP packet. That is, the protocol processing unit 107 checks each of flag bit fields 1107 through 1112 shown in FIG. 12.

If, as a result of the checking, a flag bit "SYN" 1111 in the flag bit field is set to be on and other flag bits such as a flag bit "URG" 1107, a flag bit "ACK" 1108, a flag bit "PSH" 1109, a flag bit "RST" 1110, and a flag bit "FIN" 1112 are set to be off, the protocol processing unit 107 advances to step S805. That is, the protocol processing unit 107 determines that the data of the received IP packet is a request for starting a TCP connection.

If it is determined that the flag "SYN" 1111 only is not set to be on (that is, other flags are set to be on, for example), the protocol processing unit 107 determines that the TCP packet is invalid and advances to step S806. In step S806, the protocol processing unit 107 discards the received IP packet, and the processing ends.

In step S805, the protocol processing unit 107 determines whether the port number of the destination of the TCP packet matches the receiving port number of an application communication provided by the information processing apparatus (server apparatus) 101. This determination is performed in a manner such that the protocol processing unit 107 searches the association data shown in FIG. 8, which is stored in the local RAM 106, for a receiving port number that matches the destination port number.

If the destination port number is determined to match the receiving port number, the protocol processing unit 107 advances to step S807. If it is determined that the destination port does not match the receiving port number, the protocol processing unit 107 advances to step S806. In step S806, the protocol processing unit 107 discards the received IP packet, and the processing ends.

In the processing as described above, when the processing advances to step S807, the protocol processing unit 107 determines that the protocol processing unit 107 receives a request for starting an application communication. Then, in step S807, the protocol processing unit 107 sends a concerned power source control instruction code, among power source control instruction codes 1204 shown in FIG. 8, to the power source control unit 115.

The power source control unit 115, according to the power source control instruction code, performs processing for selectively powering on the hardware devices in the application system unit 103 including the system bus 109, the CPU 110, the ROM 111, the RAM 112, the application function unit A 113, and the application function unit B 114.

When activation of the application system unit 103 is instructed in step S807, the protocol processing unit 107, in step S808, produces a TCP/IP packet for acknowledgement reply to the request for starting a TCP connection, before the application system unit 103 is completely activated. Then, the protocol processing unit 107 sends the produced TCP/IP packet for acknowledgement reply to a client apparatus that is a source of the request for an application communication, via the communication control unit 105.

In the TCP/IP packet for acknowledgement reply, the flag bit "SYN" 1111 (FIG. 12) and the flag bit "ACK" 1108 (FIG. 12) in the TCP header are set to be on. In addition, in the TCP/IP packet, a value of a TCP sequence number 1104 (FIG. 12) of the TCP packet stored in the received IP packet is set for the acknowledgement number 1104 (FIG. 12).

In steps S809 and S810, the protocol processing unit 107, with respect to an acknowledgement reply packet sent by the protocol processing unit 107 to a client apparatus, waits until the acknowledgement reply packet to be sent from the client apparatus is received, until a time-out time that is previously set.

In step S809, the protocol processing unit 107 waits until the acknowledgement reply is received. In step S810, the protocol processing unit 107 checks whether the time during which the protocol processing unit 107 waits for receiving of an acknowledgement reply elapses. If no acknowledgement reply is received from the client apparatus before the time-out time elapses, the protocol processing unit 107 advances to step S814. On the other hand, if the protocol processing unit 107 receives an acknowledgement reply from the client apparatus before the time-out time elapses, the protocol processing unit 107 advances to step S811.

In step S814, the protocol processing unit 107 performs a forced termination of the TCP connection. That is, the protocol processing unit 107, in order to suspend the TCP connection with the client apparatus, produces a TCP packet whose flag bit "RST" 1110 (FIG. 12) in the TCP header is set to be on and then sends the TCP/IP packet from the communication control unit 105 to the network 116. Thus, the protocol processing unit 107 cancels the request for starting the application communication issued by the client apparatus.

In step S815, the protocol processing unit 107 sends a power source control instruction to the power source control unit 115 so that the application system unit 103 shifts again to a low power consumption state. When the power source control unit 115 receives the power source control instruction, the power source control unit 115 sends an instruction, to the application system unit 103, for starting processing for powering off the whole information processing apparatus 101. When the application system unit 103 receives the instruction, the application system unit 103 immediately starts processing for terminating the system so as to power off the information processing apparatus 101, even when an operation for restoring from the low power consumption state of the information processing apparatus 101 is being performed. Then the process ends at step S817.

In steps S811 through S813, the protocol processing unit 107, while waiting until the completion of activation of the application system unit 103 is notified, performs processing for temporarily storing data of an application communication when the protocol processing unit 107 receives a packet from a client apparatus before the completion of activation of the application system unit 103.

The CPU 110 of the application system unit 103, after confirming the completion of activation of the application system unit 103, issues a notification indicating that the application system unit 103 is completely activated (activation completion notification) to the protocol processing unit 107. In step S811, the protocol processing unit 107 determines whether the protocol processing unit 107 receives the activation completion notification. If it is determined that the protocol processing unit 107 does not receive the activation completion notification, the protocol processing unit 107 advances to step S812.

In step S812, the protocol processing unit 107 determines whether an application communication packet is received from a client apparatus via the communication control unit 105. If it is determined that the protocol processing unit 107 receives an application communication packet from the client apparatus, the protocol processing unit 107 advances to step S813. On the other hand, if it is determined that the protocol processing unit 107 does not receive an application communication packet from the client apparatus, the protocol processing unit 107 returns to step S811.

In step S813, the protocol processing unit 107 stores application communication data in the local RAM 106.

On the other hand, if it is determined that the protocol processing unit 107 receives the activation completion notification in step S811, the processing advances to step S816. It is to be noted here that after performing step S816, the processing advances to continue to step S901 in FIG. 10, and the next processing by the protocol processing unit 107 is step S902.

In step S902, the protocol processing unit 107 issues a notification to the application system unit 103 as to which application communication is to be started. More specifically, the protocol processing unit 107 notifies to a system program operating on the CPU 11 a content (type) of the application communication, which is indicated by the items 1202 and 1203 in FIG. 8 and an application protocol to be used.

The CPU 110, based on the system program, performs preprocessing for the application system unit 103 necessary for an application communication designated by a notification by the protocol processing unit 107. Then, the CPU 110 notifies an address and size of a memory area on the RAM 112 used in output and input of the application communication data. That is, the CPU 11 issues a notification of both a transmission buffer and a reception buffer used in the application communication.

Then, the protocol processing unit 107 advances from step S902 to step S903. In steps S903 through S906, the protocol processing unit 107 waits for a notification of the transmission buffer and the reception buffer used in the application communication. Then, when the protocol processing unit 107 receives an application communication packet that is a packet for an application from a client apparatus while waiting for the notification, the protocol processing unit 107 temporarily stores the application communication packet as application communication data.

In step S903, the protocol processing unit 107 determines whether the protocol processing unit 107 receives the notification of the transmission buffer and the reception buffer from the application system unit 103. If it is determined that the protocol processing unit 107 receives the notification, the protocol processing unit 107 advances to step S904. If it is determined that the protocol processing unit 107 does not receive the notification, the protocol processing unit 107 advances to step S905.

In step S905, the protocol processing unit 107 determines whether the protocol processing unit 107 receives an application communication packet from a client apparatus via the communication control unit 105. If it is determined that the protocol processing unit 107 receives an application communication packet from a client apparatus, the protocol processing unit 107 advances to step S906. On the other hand, if it is determined that the protocol processing unit 107 does not receive an application communication packet from a client apparatus, the protocol processing unit 107 returns to step S903. In step S906, the protocol processing unit 107 stores the application communication data received from a client apparatus in the local RAM 106.

In step S904, the protocol processing unit 107 determines whether the protocol processing unit 107 has stored the application communication data sent from a client apparatus in the local RAM 106 in step S813 in FIG. 9 or step S906. If it is determined that the application communication data is already stored in the local RAM 106, the protocol processing unit 107 advances to step S907. On the other hand, if it is determined that the application communication data is not stored in the local RAM 106, the protocol processing unit 107 advances to step S908.

In step S907, the protocol processing unit 107 transfers the application communication data stored in the local RAM 106 to a reception buffer area of the RAM 112.

In step S908, the protocol processing unit 107 notifies the application system unit 103 of the start of an application communication. The system program operating on the CPU 110, after confirming the notification, starts the application communication. Then the process ends at step S909.

As described above, the protocol processing unit 107 performs processing when the information processing apparatus 101 is in a low power consumption state. Note that in the above description, a description as to the processing for checking an IP header checksum in an IP packet and a TCP checksum in a TCP packet in the processing by the protocol processing unit 107 is omitted.

The protocol processing unit 107 performs checking of the checksum at the time of analysis of a header of each packet (steps S802 and S804), and if it is determined that there is a data error in a packet, discards the received packet.

Figure 13:
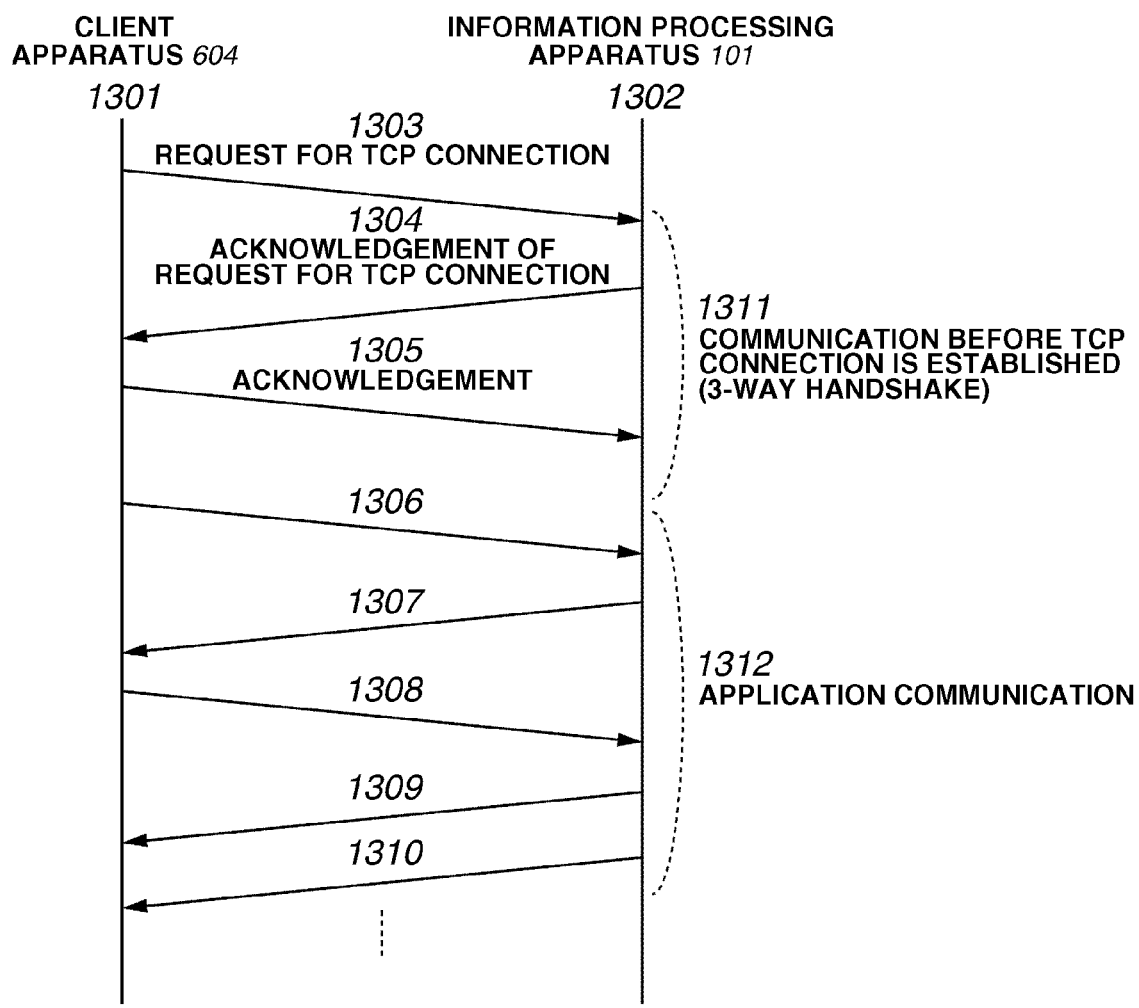
FIG. 13 illustrates an exemplary sending and receiving sequence in a normal system in an early stage after start of the application communication between the information processing apparatus and the client apparatus according to an exemplary embodiment of the present invention.

Now, a description is made as to a sending and receiving sequence in a normal system in an early stage after start of the application communication between the information processing apparatus 101 and the client apparatus 604 with reference to FIG. 13.

Referring to FIG. 13, an axis 1301 indicates a time base for the client apparatus 604 and an axis 1302 indicates a time base for the information processing apparatus 101. Arrows 1303 through 1310, which are drawn in between both time bases, respectively indicate a sending direction of communication data.

An arrow 1303 indicates a transfer of a communication packet that requests a TCP connection to be started. The communication packet refers to a TCP packet requesting start of an application communication. The information processing apparatus 101, when receiving a TCP connection starting request communication packet 1303, sends an acknowledgement reply TCP packet 1304 in response to the TCP connection starting request. The client apparatus 604, when receiving the acknowledgement reply TCP packet 1304, sends an acknowledgement reply TCP packet 1305 to the information processing apparatus 101 in response to the acknowledgement reply TCP packet 1304.

The client apparatus 604 and the information processing apparatus 101 determine that a TCP connection is established by three TCP packet interactions 1311. The communication 1311 for establishing the TCP connection is called a "3-way handshake".

When the TCP connection between the client apparatus 604 and the information processing apparatus 101 is thus established, the client apparatus 604 starts a communication with the information processing apparatus 101 using an application protocol such as HTTP and FTP. The arrows 1306 through 1310 respectively indicate an application communication 1312.

When the information processing apparatus 101 is in a low power consumption state (a state in which the hardware devices in the application system unit 103 (except for the power source control unit 115) are powered off), and when the information processing apparatus 101 receives a request for starting an application communication from the client apparatus 604, the application system unit 103 is activated. In this case, a communication 1311 until the establishment of a TCP connection is performed by the network communication unit 102. An application communication 1312 is performed by the network communication unit 102 and the activated application system unit 103.

According to the present exemplary embodiment, during a time when the information processing apparatus 101 does not perform an application communication, the hardware devices except for the power source control unit 115 in the application system unit 103 can be powered off. Thus, low power consumption can be implemented.

In addition, according to the present exemplary embodiment, a request for starting an application communication is determined to be received when a TCP packet whose destination port number used for starting a TCP communication connection is any of receiving port numbers per each application communication. Thus, the information processing apparatus 101 can be remotely activated with a standard TCP/IP protocol communication, and no special unit is required.

In addition, according to the present exemplary embodiment, only a device that is necessary for performing an application communication, of the devices in the application system unit 103 that are powered off when the information processing apparatus 101 is in a low power consumption state, is selectively activated. Thus, a time required to restore the information processing apparatus 101 from a low power consumption state can be shortened. In addition, the protocol processing unit 107 establishes a TCP connection for an application communication before the application system unit 103 is completely activated. Accordingly, the application system unit 103 can start an application communication immediately after being activated.

Second Exemplary Embodiment

Now, a second exemplary embodiment of the present invention is described with reference to FIG. 14 and FIG. 15. In the second exemplary embodiment, a description is made as to an example using a network camera 1401 shown in FIG. 14, which is an example of the information processing apparatus 101 described in the first exemplary embodiment above.

The network camera 1401 according to the present exemplary embodiment distributes photographed still image data or photographed moving image data. In addition, the network camera 1401 is capable of performing control such as starting of photographing, termination of photographing, panning, tilting, and zooming, according to an instruction sent by a client apparatus via a network.

In addition, the network camera 1401 includes a secondary storage device that stores photographed still images and photographed moving images, and can transfer still image data and moving image data that are photographed so far to a client apparatus. In addition, the network camera 1401 includes a function of a built-in web server. That is, a user is allowed to display photographed images, operate the camera, or perform system settings from a client apparatus including a web browser function, such as a personal computer (PC) and a mobile phone, connected via a network. Each such function is implemented utilizing a communication via a network.

Figure 14:
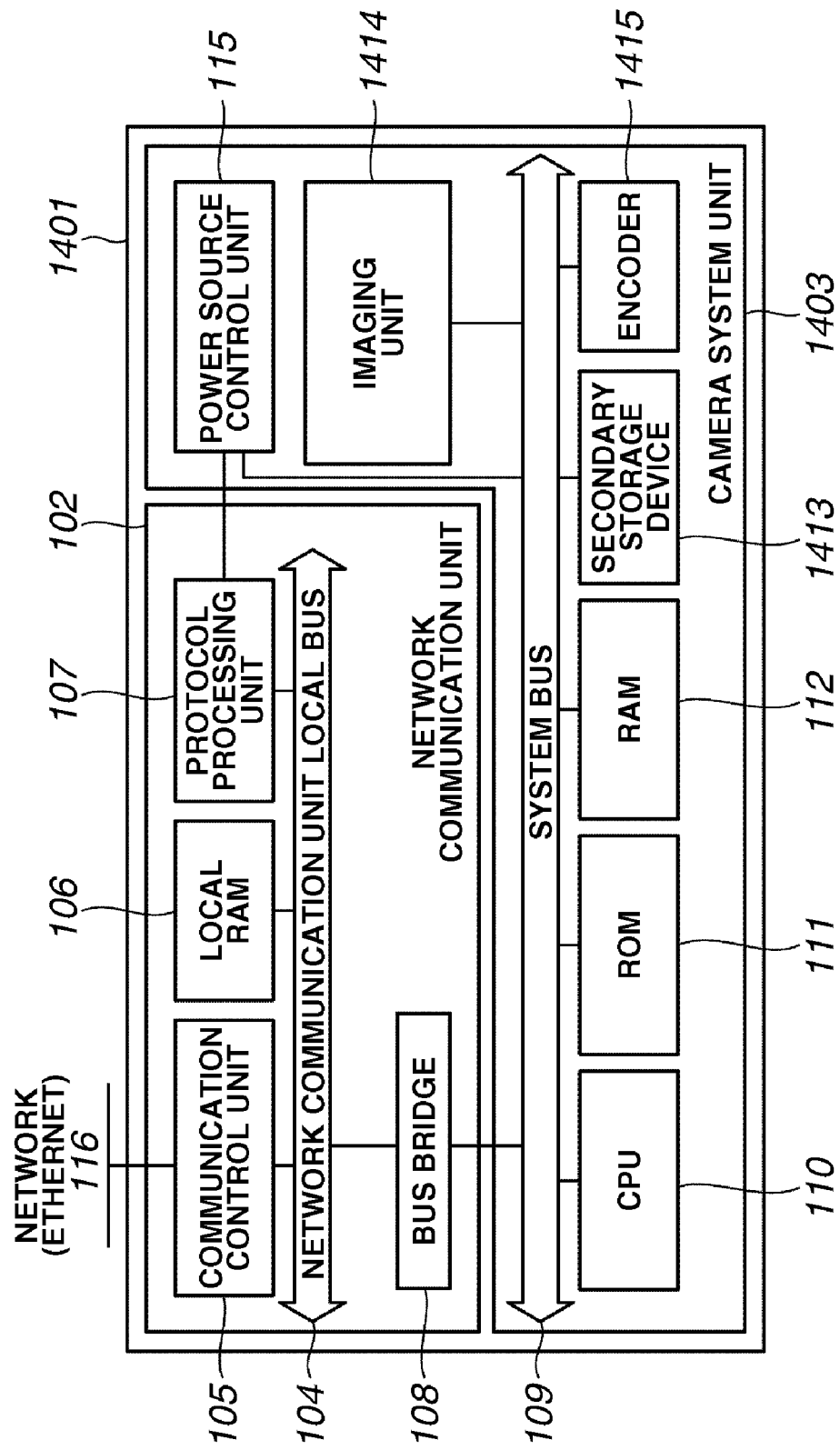
FIG. 14 illustrates an example of a network camera according to an exemplary embodiment of the present invention.

In particular, FIG. 14 illustrates an example of a network camera. Note that units and portions that are similar to those in FIG. 3 are denoted by the same reference numerals, assuming that such units and portions have functions described in the first exemplary embodiment, and accordingly, a description thereof is omitted here. Referring to FIG. 14, the network camera 1401 includes a camera system unit 1403 as the application system unit 103.

The RAM 112 of the camera system unit 1403 stores a program for implementing a camera system. The camera system program is read from the ROM 111 to the RAM 112 so as to be executed by the CPU 110.

In addition, a secondary storage device 1413, which is connected to the system bus 109, is a non-volatile memory device for storing data in a hard disk drive or a large-capacity memory such as a CompactFlash (CF) card and a secure digital (SD) memory card. The secondary storage device 1413 is primarily used for storing still image data and moving image data photographed by the network camera 1401 in a file format.

In addition, an imaging unit 1414, which is connected to the system bus 109, includes a lens, a charge-coupled device (CCD), and a CCD control unit. The imaging unit 1414 converts a photographed image that is projected by passing through the lens into an analog electric signal by using the CCD. In addition, the imaging unit 1414 performs noise reduction on the analog electric signal and performs an A/D conversion to convert the analog electric signal into digital data.

An encoder 1415, which is connected to the system bus 109, performs encoding (compression encoding) of non-compressed digital image data. The imaging unit 1414 outputs non-compressed digital image data at regular intervals and the encoder 1415 encodes the non-compressed digital image data, so that still image data and moving image data to be distributed to a client apparatus are produced. Note that the encoder 1415 according to the present exemplary embodiment is a hardware device that implements an encoding processing of image data at a high speed and conforms to a plurality of different encoding formats. The encoding formats include Joint Photographic Experts Group (JPEG) standard and Moving Picture Experts Group (MPEG) phase 4.

An application function of the network camera 1401 is implemented by the camera system unit 1403. In addition, the CPU 110, based on the system program, performs an application communication that is a part of the application function of the network camera 1401. For example, in streaming-distribution of photographed video, non-compressed image frame data photographed by the imaging unit 1414 is encoded by the encoder 1415 and the compressed image data is output to the RAM 112. Then, the CPU 110 produces streaming data having a format with which the streaming data can be sent with a streaming protocol, based on the compressed image data stored on the RAM 112. Then, the CPU 110, utilizing the network communication unit 102 having a function for processing a lower layer TCP/IP protocol, sends the streaming data to a distribution destination.

In addition, the CPU 110, based on the system program, receives and interprets a photographing operation command from a client apparatus. Then, the command is executed by instructing the imaging unit 1414 and the encoder 1415 to perform an operation according to the photographing operation command. More specifically, first, the network communication unit 102 receives a communication packet and performs processing for receiving a TCP/IP protocol packet. Then, a data segment having a data format of a protocol for a photographing operation command is input to the system program, and thus the photographing operation command issued by the user is received.

While an application communication is being performed, in the network camera 1401, at least the network communication unit 102, the system bus 109, the ROM 111, the RAM 112, and the power source control unit 115 are operating. On the other hand, while no application communication is performed, the network camera 1401 powers off each hardware device in the camera system unit 1403. Then, the network camera 1401 allows only the network communication unit 102 and the power source control unit 115 to operate. Thus, the network camera 1401 can be shifted to a low power consumption state in which an amount of power consumption is considerably reduced.

In the low power consumption state, only the network communication unit 102 and the power source control unit 115 in the network camera 1401 operate and the network camera 1401 waits for a request for starting an application communication from a client apparatus. In addition, the network communication unit 102, when receiving a request for starting an application communication, powers on devices necessary for performing the application communication among the devices included in the camera system unit 1403. Thus, the camera system unit 1403 and the network communication unit 102 operate so as to start the application communication.

The protocol processing unit 107, when the frame data received through the network 116 satisfies all of the following three conditions, determines that the frame data is a request for starting an application communication provided by the network camera 1401. A first condition is that the frame data is a TCP packet addressed to the network camera 1401. A second condition is that the frame data is a TCP packet requesting a start of a TCP connection. A third condition is that a destination port number of the TCP packet is the same as a receiving port number for an application communication. When the frame data satisfies all of these conditions, the data is determined to be a request for starting an application communication.

The protocol processing unit 107 performs processing for determining whether the data is a request for starting an application communication. When the network camera 1401 is in a low power consumption state, if it is determined that the frame data is a request for starting an application communication, the protocol processing unit 107 issues a power source control instruction to the power source control unit 115 so as to power on the devices in the camera system unit 1403.

In order to perform the processing for determining whether the data is a request for starting an application communication, the protocol processing unit 107 stores, in the local RAM 106, association data containing an application communication, a receiving TCP port number, and a power source control instruction code issued to the power source control unit 115. FIG. 15 illustrates an example of the association data.

Referring to FIG. 15, an item 1501 indicates a receiving TCP port number. An item 1502 indicates a content (type) of an application communication corresponding to the TCP port number. An item 1503 indicates a name of an application protocol in an application communication. An item 1504 indicates a power source control instruction code issued to the power source control unit 115. In addition, an item 1505 indicates devices (hardware devices) in the camera system unit 1403 that are activated according to the power source control instruction code.

For example, in a specific field of a table 1506, the TCP port number that the network camera 1401 receives is "8080" and a content of the application communication is a streaming distribution of a video photographed by the network camera 1401. In addition, it is indicated that an application protocol used for the streaming-distribution and corresponding to the TCP port number "8080" is an HTTP protocol. In addition, it is indicated that when the network camera 1401 is restored from a low power consumption state, the protocol processing unit 107 sets a power source control instruction code "0x81" to the power source control unit 115. Further, it is indicated that the devices that are powered on for activation corresponding to the TCP port number "8080" are the system bus 109, the CPU 110, the ROM 111, the RAM 112, the imaging unit 1414, and the encoder 1415. The other processings are similar to those in the first exemplary embodiment, and accordingly, a description thereof is omitted here.

According to the present exemplary embodiment, during a time when the network camera 1401 does not perform an application communication, the hardware devices except for the power source control unit 115 in the camera system unit 1403 can be powered off. Thus, low power consumption can be implemented.

In addition, according to the present exemplary embodiment, the request for starting an application communication is determined to be received when a TCP packet whose destination port number used for starting a TCP communication connection is any of receiving port numbers per each application communication. Thus, the network camera 1401 can be remotely activated with a standard TCP/IP protocol communication.

In addition, according to the present exemplary embodiment, only a device that is necessary for performing an application communication, of the devices in the camera system unit 1403 that are powered off when the network camera 1401 is in a low power consumption state, is selectively activated. Thus, a time required to restore the network camera 1401 from the low power consumption state can be shortened.

In addition, according to the present exemplary embodiment, the protocol processing unit 107 establishes a TCP connection for an application communication before the camera system unit 1403 is completely activated. Accordingly, the camera system unit 1403 can start an application connection immediately after being activated.

Third Exemplary Embodiment

Now, a third exemplary embodiment of the present invention is described. In the third exemplary embodiment of the present invention, a description is made as to an example in which an information processing apparatus, on a need basis, performs authentication of a client apparatus according to a request for starting an application communication from the client apparatus, and if the client apparatus is appropriately authenticated, the information processing apparatus is restored from a low power consumption state. Note that in the third exemplary embodiment, a description is made as to only points different from the first exemplary embodiment, and a description as to similar points is omitted here.

Figure 16:
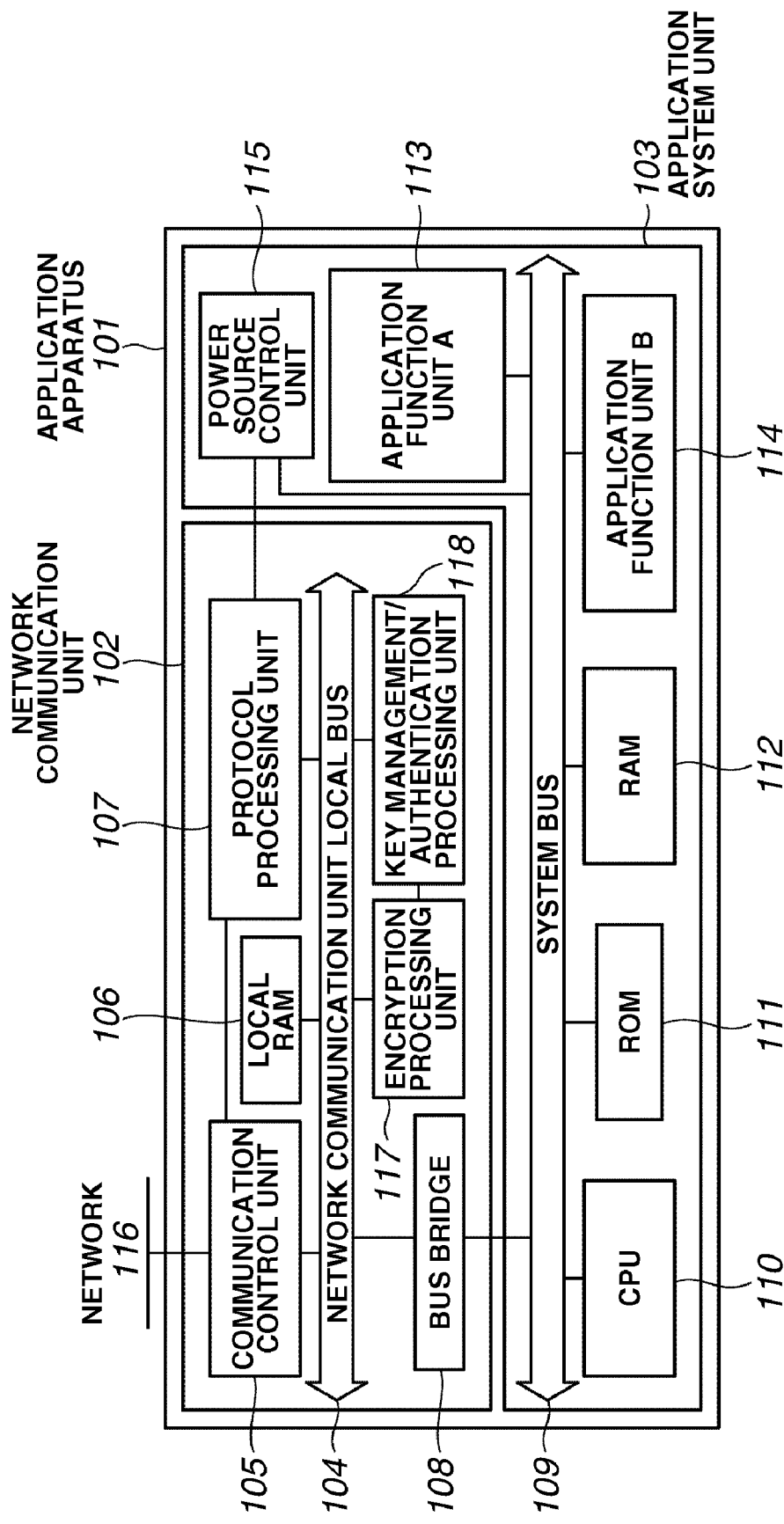
FIG. 16 illustrates an example of an information processing apparatus according to an exemplary embodiment of the present invention.

FIG. 16 illustrates an example of an information processing apparatus. Referring to FIG. 16, the information processing apparatus 101 includes the network communication unit 102 and the application system unit 103.

The configuration shown in FIG. 16 is different from the configuration shown in FIG. 3 described in the first exemplary embodiment in a point that the network communication unit 102 further includes an encryption processing unit 117 and a key management/authentication processing unit 118.

A function for encrypted communication by the network communication unit 102 is implemented by the protocol processing unit 107, the encryption processing unit 117, and the key management/authentication processing unit 118. A negotiation processing for creating an encrypted communication session and a processing of an encrypted communication protocol are performed by the protocol processing unit 107.

The protocol processing unit 107 performs an encryption processing of communication data, a processing of computation for decryption, and a computation processing of a message digest in the communication data by controlling the encryption processing unit 117. In addition, the protocol processing unit 107 performs a processing for authentication of a client apparatus and management of key data used for encryption and decryption of the communication data by controlling the key management/authentication processing unit 118.

The encryption processing unit 117 is a hardware device that performs various processings such as compression/decompression of communication data, a processing for computing an algorithm for encryption/decryption, and a computation processing of a message digest of communication data using an encryption key. In addition, the encryption processing unit 117 produces random numbers within a given range. An encryption algorithm that the encryption processing unit 117 can conform to includes Rivest's cipher 2 (RC2), RC4, data encryption standard (DES), 3DES, advanced encryption standard (AES), Rivest-Shamir-Adlema (RSA), Diffie-Helman algorithm (DH), and digital signature standard (DSS). In addition, an algorithm for computing a message digest that the protocol processing unit 107 can conform to includes, for example, message digest 5 (MD5) and Secure Hash Algorithm 1 (SHA1).

The key management/authentication processing unit 118 is a hardware device that manages a key in an encrypted communication and a plurality of processings for authenticating a client apparatus. More specifically, the key management/authentication processing unit 118 manages a public key and a private key for the information processing apparatus 101 in a public key encryption method and also manages a digital certificate of the information processing apparatus 101. In addition, the key management/authentication processing unit 118 performs a plurality of authentication processings.

For example, the key management/authentication processing unit 118 performs an authentication processing for verifying a digital certificate of a client apparatus so as to determine whether the client apparatus is an authenticated apparatus and an authentication processing for authenticating a right for utilizing the information processing apparatus 101 by verifying an ID and a password of the client apparatus. In addition, the key management/authentication processing unit 118 manages various confidential information in each authentication processing. In addition, the key management/authentication processing unit 118 produces and manages a common key that is used for encryption of a communication in each encrypted communication session.

The local RAM 106 is used as a storage area for temporarily storing data in the processing by the communication control unit 105, the protocol processing unit 107, the encryption processing unit 117, and the key management/authentication processing unit 118.

An application function of the information processing apparatus 101 is implemented by the application system unit 103. In addition, based on the system program, the CPU 110 performs an application communication which is a part of the application function. The application communication is a communication performed utilizing a TCP/IP protocol. The TCP/IP protocol processing and the encrypted communication processing are performed by the network communication unit 102. Sharing of functions for communication processing is described below with reference to FIG. 17.

Figure 17:
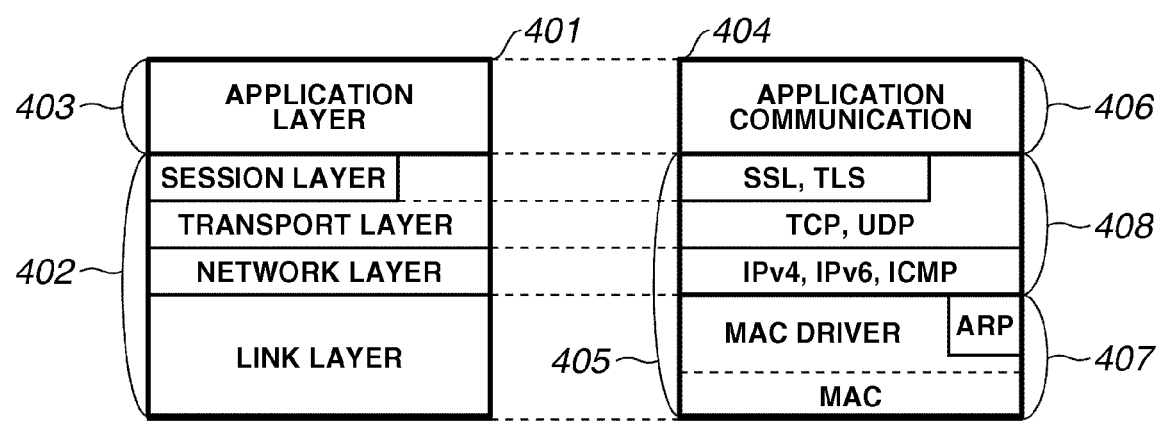
FIG. 17 illustrates an example of sharing of functions for communication processing according to an exemplary embodiment of the present invention.

In the hierarchical model 401 shown in FIG. 17, an encrypted communication protocol is represented by a session layer positioned between the transport layer and the application layer 403. The session layer, using a protocol for a transport layer in a lower layer, provides a logical communication link to an application protocol in an upper layer. A Secure Sockets Layer (SSL) and Transport Layer Security (TLS) are protocols in the session layer. By using SSL and TLS, a communication link (encrypted communication session), which is used for encrypting a content of an application communication and performing sending and receiving of data with a high reliability by utilizing the TCP for a protocol in a lower layer, is created.

The processing using network layer protocols such as IPv4, IPv6, and ICMP, which is indicated in the range 408, and the processing using transport layer protocols such as UDP and TCP are performed by the protocol processing unit 107. The encrypted communication processing using SSL and TLS is performed by the protocol processing unit 107, the encryption processing unit 117, and the key management/authentication processing unit 118 in cooperation with one another.

Figure 18:
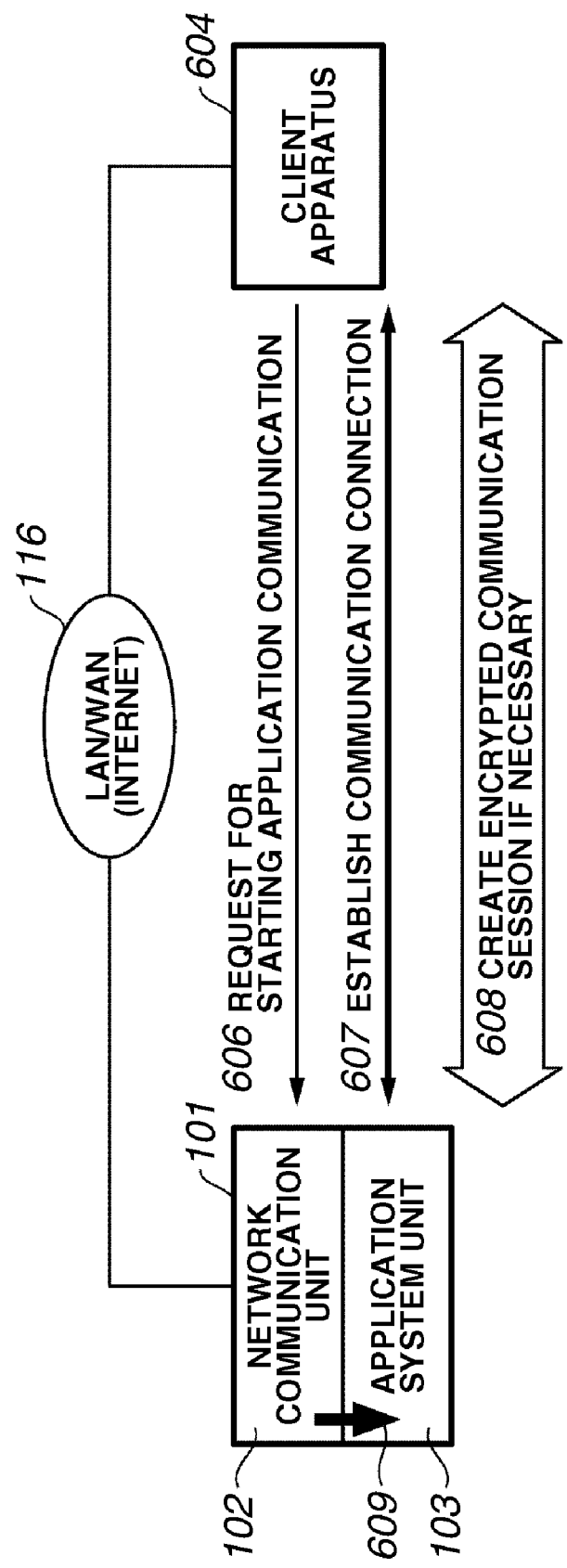
FIG. 18 illustrates an exemplary operation of the information processing apparatus when the information processing apparatus, in a low power consumption state, receives a request for starting an application communication from a client apparatus according to an exemplary embodiment of the present invention.

Now, a communication operation performed when the information processing apparatus 101 in a low power consumption state receives a request for starting an application communication from a user is described below with reference to FIG. 18. Hereinbelow, for a simpler description, a description is made as to only points different from the configuration shown in FIG. 6.

The client apparatus 604, which is operated by a user, sends an application communication start request signal 606 to the information processing apparatus 101. Then, the network communication unit 102 of the information processing apparatus 101 receives the application communication start request signal 606. The network communication unit 102, when receiving the application communication start request signal 606, sends an acknowledgement signal to the client apparatus 604 and establishes a communication connection 607 between the client apparatus 604 and the information processing apparatus 101.

When the application communication that is requested to be started needs authentication of the client apparatus 604, the network communication unit 102 creates an encrypted communication session 608 on the communication connection 607. The authentication processing by the network communication unit 102 is performed at the time of negotiation in the course of creating the encrypted communication session 608 or at the time of encrypted communication after the encrypted communication session 608 is created. When authentication of the client apparatus 604 is not required, the network communication unit 102 does not create (produce) the encrypted communication session 608. When communication for performing an application communication is prepared as described above, the network communication unit 102 powers on the application system unit 103 (an operation 609 in FIG. 18).

The protocol processing unit 107 according to the present exemplary embodiment, in addition to the processing in the first exemplary embodiment, determines whether the application communication needs authentication of a client apparatus. If it is determined that the application communication needs authentication of a client apparatus, the protocol processing unit 107 determines a method of authentication. Note that when authentication of a client apparatus is required, each of the application communications is an encrypted communication. The protocol processing unit 107, after the TCP connection with a client apparatus is established, performs a processing for creating an encrypted communication session based on SSL or TLS, while controlling the encryption processing unit 117 and the key management/authentication processing unit 118. In addition, the protocol processing unit 107 performs the processing for authenticating a client apparatus while controlling the encryption processing unit 117 and the key management/authentication processing unit 118.

In addition, if it is determined that authentication of a client apparatus is not required or when the client apparatus is appropriately authenticated, the protocol processing unit 107 issues a power source control instruction to the power source control unit 115. The power source control unit 115 powers on the hardware devices in the application system unit 103 related to the application communication, according to the power source control instruction.

In the present exemplary embodiment, data including items concerning the method of authentication of a client apparatus as well as the items shown in FIG. 8 are stored as a table. FIG. 19 illustrates a table 1906, which is an example of an association data table. Note that portions and units that are similar to those in the first exemplary embodiment are provided with the same reference numerals.

Referring to FIG. 19, an item 1904 indicates an authentication method for a client apparatus in an application communication. For example, in a specific field in the table 1906, it is indicated that when the TCP port number that the information processing apparatus 101 receives is "80", a content of the application communication includes a transfer of operation page data for web browsing by the information processing apparatus 101. In addition, it is indicated that the protocol used for the application communication is an HTTP protocol. In addition, it is indicated that the protocol processing unit 107 sets a power source control instruction code "0x41" to the power source control unit 115 when the information processing apparatus 101 is activated from a low power consumption state by the application communication.

Figure 20:
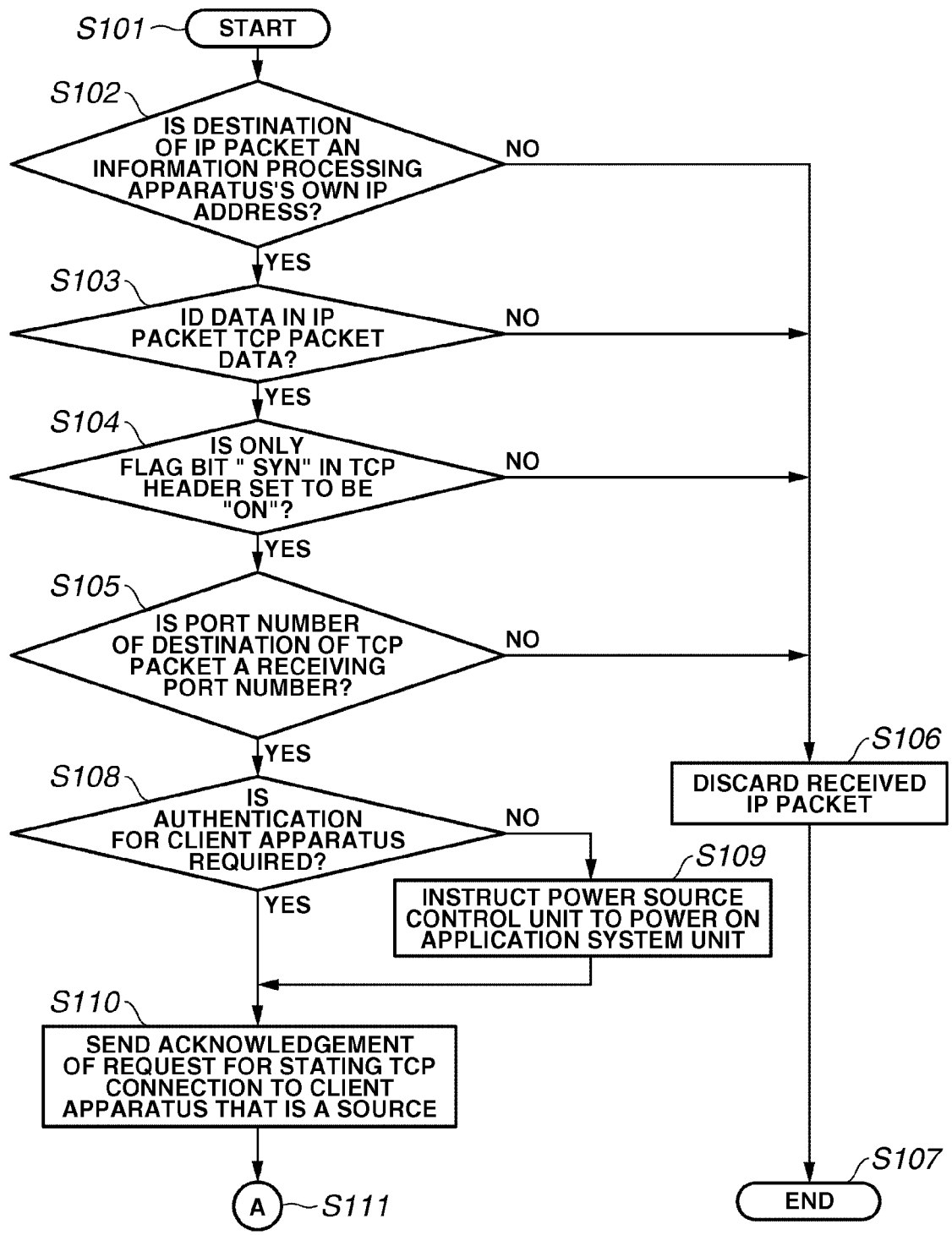
FIG. 20 is a flow chart that illustrates an example of processing performed by a protocol processing unit when the information processing apparatus is in a low power consumption state according to an exemplary embodiment of the present invention.

The processing performed by the protocol processing unit 107 when the information processing apparatus 101 is in a low power consumption state is described below with reference to FIG. 20, FIG. 21, FIG. 22, and FIG. 23. Each of FIGS. 20 through 23 is a flow chart illustrating the processing performed by the protocol processing unit 107 when the information processing apparatus 101 is in a low power consumption state. Note that the processing in steps S101 through S106 in FIG. 20 is similar to the processing in steps S801 through S806 in FIG. 9, and accordingly, a description thereof is omitted here.

In the processing described above, when the processing advances up to step S108, the protocol processing unit 107 determines that a request for starting an application communication has been received.

In step S108, the protocol processing unit 107 retrieves association data shown in FIG. 19 which is stored in the local RAM 106, based on the receiving port number, so as to determine whether authentication of a client apparatus is required. If it is determined that authentication of a client apparatus is required, the protocol processing unit 107 advances to step S110. If it is determined that authentication of a client apparatus is not required, the protocol processing unit 107 advances to step S109.

In step S109, the protocol processing unit 107 sends a concerned power source control instruction code, among power source control instruction codes 1905 in FIG. 19, to the power source control unit 115. The power source control unit 115, according to the power source control instruction code, performs processing for selectively powering on the hardware devices in the application system unit 103 including the system bus 109, the CPU 110, the ROM 111, the RAM 112, the application function unit A 113, and the application function unit B 114.

In step S110, the protocol processing unit 107 produces a TCP/IP packet that is an acknowledgement reply to the TCP connection start request, and then sends the produced TCP/IP packet to the client apparatus that is a source of request for an application communication, via the communication control unit 105. In the TCP/IP packet for acknowledgement reply, the flag bit "SYN" 1111 (FIG. 12) and the flag bit "ACK" 1108 (FIG. 12) in the TCP header are set to be on. In the TCP/IP packet, a value of a TCP sequence number 1104 (FIG. 12) of the TCP packet stored in the received IP packet is set for the acknowledgement number 1104 (FIG. 12).

Note that when activation of the application system unit 103 is instructed in step S109, the processing in step S110 is performed before the application system unit 103 is completely activated.

Figure 21:
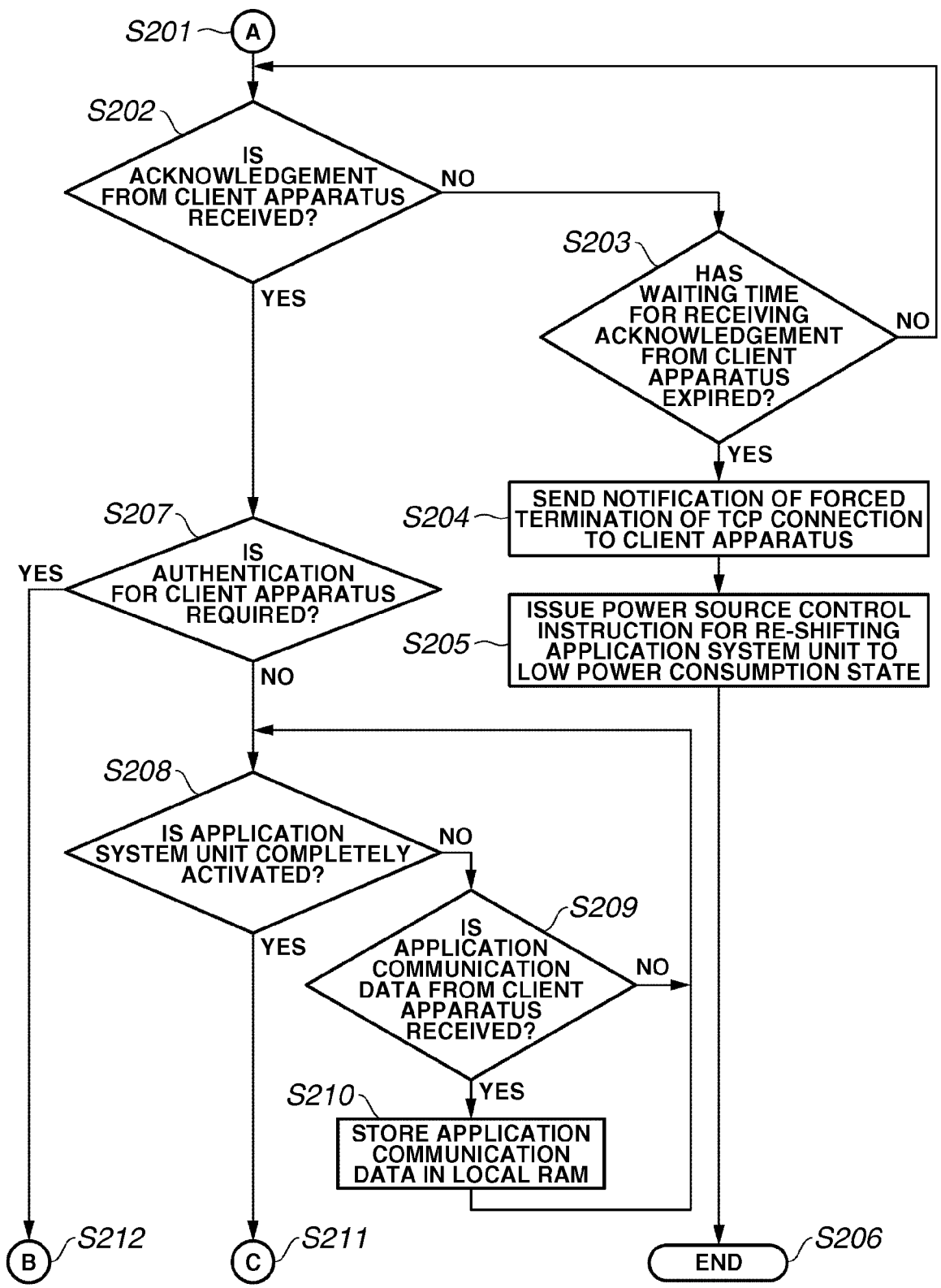
FIG. 21 is a flow chart that illustrates an example of processing performed by the protocol processing unit when the information processing apparatus is in a low power consumption state according to an exemplary embodiment of the present invention.

The processing in step S111 advances to continue to step S201 in FIG. 21, and accordingly, the next processing by the protocol processing unit 107 is step S202. In steps S202 and S203 in FIG. 21, the protocol processing unit 107, with respect to an acknowledgement reply packet sent by the protocol processing unit 107 to the client apparatus in step S110, waits to receive an acknowledgement reply packet to be sent from the client apparatus until a time-out time that is previously set. Note that the processing in steps S203 through S206 is similar to the processing in steps S810 through S817 in FIG. 9, and accordingly, a description thereof is omitted here.

In step S202, when the protocol processing unit 107 receives an acknowledgement reply packet sent from the client apparatus, a TCP connection between the client apparatus and the information processing apparatus 101 is established. Then, in step S207, the protocol processing unit 107 determines whether the application communication to be started requires authentication of the client apparatus, just as in step S108.

If it is determined that an authentication of the client apparatus is required, the protocol processing unit 107 advances to step S212. On the other hand, if it is determined that an authentication of the client apparatus is not required, the protocol processing unit 107 advances to step S208. The processing in step S212 advances to continue to step S301 in FIG. 22, and accordingly, the next processing by the protocol processing unit 107 is step S302.

In steps S208 through S210, the protocol processing unit 107, while waiting until the completion of activation of the application system unit 103 is notified, performs processing for temporarily storing data at the time of an application communication when the protocol processing unit 107 receives a packet from the client apparatus before the completion of activation of the application system unit 103.

The CPU 110 of the application system unit 103, after confirming the completion of activation of the application system unit 103, issues a notification indicating that the application system unit 103 is completely activated (activation completion notification) to the protocol processing unit 107. In step S208, the protocol processing unit 107 determines whether the protocol processing unit 107 has received the activation completion notification. If it is determined that the protocol processing unit 107 has not received the activation completion notification, the protocol processing unit 107 advances to step S209. On the other hand, if it is determined that the protocol processing unit 107 has received the activation completion notification, the protocol processing unit 107 advances to step S211. The processing in step S211 advances to continue to step S401 in FIG. 23, and the next processing by the protocol processing unit 107 is step S402.

Note that the processing in steps S209 and S210 is similar to the processing in steps S812 and S813 in FIG. 9, and accordingly, a description thereof is omitted here.

In the present exemplary embodiment, the method of authenticating a client apparatus is broadly divided into two cases, namely, a case where the authentication is performed at the time of negotiation in the course of creating an encrypted communication session and a case where a user authentication of a client apparatus is performed by utilizing the encrypted communication after the encrypted communication session is created.

Figure 22:
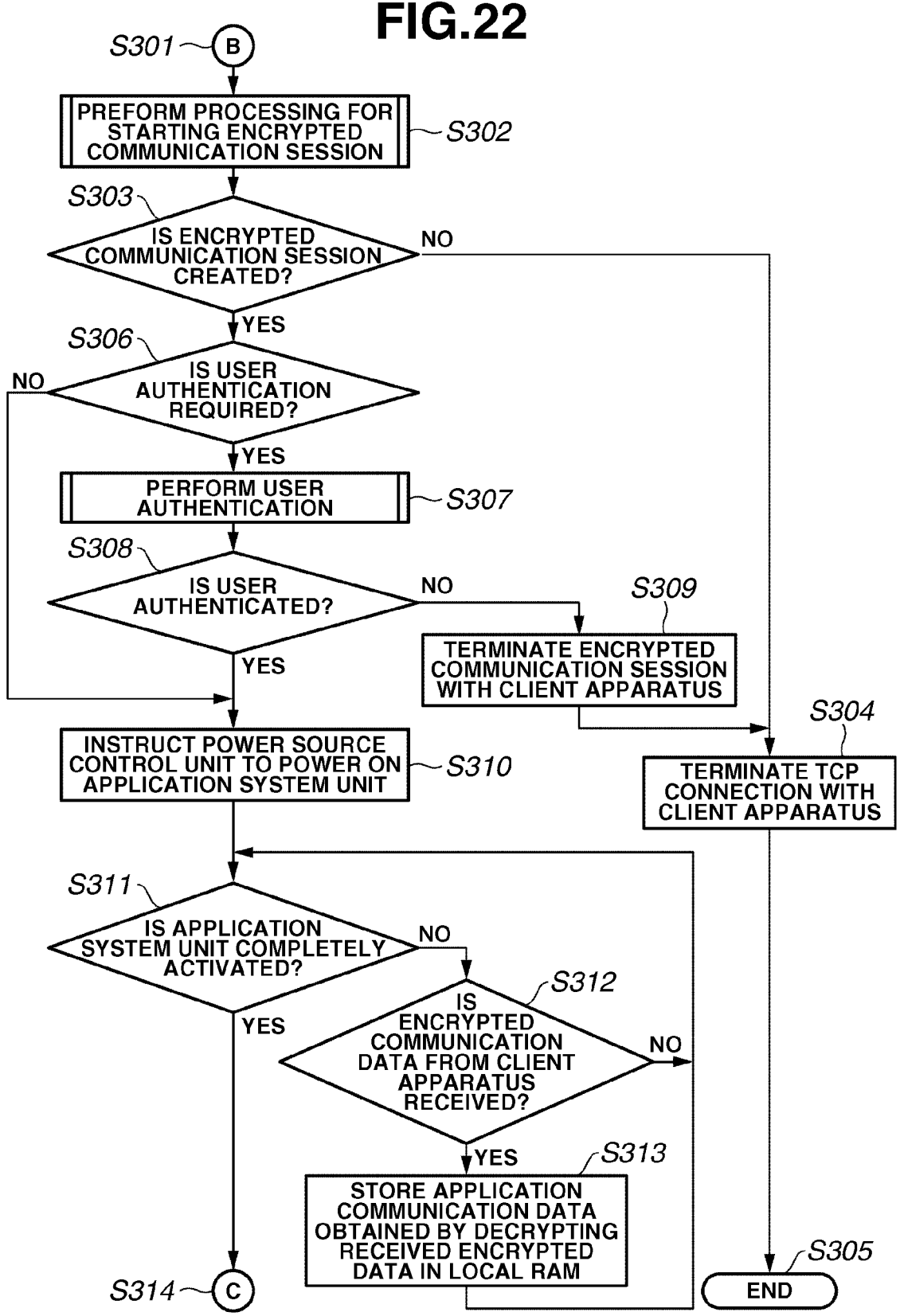
FIG. 22 is a flow chart that illustrates an example of processing performed by the protocol processing unit when the information processing apparatus is in a low power consumption state according to an exemplary embodiment of the present invention.

Now referring to FIG. 22, in step S302, the protocol processing unit 107 performs processing for communication with the client apparatus for creating an SSL- or TLS-based encrypted communication session. Note that when the authentication of the client apparatus is performed at the time of negotiation in the course of creating an encrypted communication session, the protocol processing unit 107 performs the communication processing including the authentication processing. In step S302, when the protocol processing unit 107 performs the authentication processing of a client apparatus and when the client apparatus is not authenticated, no encrypted communication session can be created. Here, the protocol processing unit 107 determines whether authentication of the client apparatus is performed at the time of negotiation in the course of creating an encrypted communication session, according to the concerned authentication method 1904 included in the association data shown in FIG. 19.

In step S303, the protocol processing unit 107 determines whether the encrypted communication session has been created. If it is determined that the encrypted communication session has been created, the protocol processing unit 107 advances to step S306. On the other hand, if it is determined that the encrypted communication session has not been created, the protocol processing unit 107 advances to step S304. In step S304, the protocol processing unit 107 terminates the TCP connection with the client apparatus, and then advances to step S305. In step S305, the processing ends.

On the other hand, in step S306, the protocol processing unit 107 determines whether user authentication is required according to the concerned authentication method 1904 included in the association data shown in FIG. 19. If it is determined that the user authentication is required, the protocol processing unit 107 advances to step S307. On the other hand, if it is determined that the user authentication is not required, the protocol processing unit 107 advances to step S310.

In step S307, the protocol processing unit 107, utilizing the encrypted communication, performs user authentication of a user who operates the client apparatus. More specifically, the protocol processing unit 107 requests the client apparatus to enter a user ID and a password of the user who requests the application communication. The protocol processing unit 107, when receiving the user ID and the password from the client apparatus, inquires the key management/authentication processing unit 118 whether the user can be authenticated with a combination of the input user ID and password in the application communication to be started.

Then, the key management/authentication processing unit 118 replies to the protocol processing unit 107 as to whether the user can be authenticated with the combination of the input user ID and password. In addition, if the user can be authenticated with the combination of the input user ID and password, the key management/authentication processing unit 118 authenticates the user and then sends information on whether the user is successfully authenticated to the protocol processing unit 107.

Next, in step S308, the protocol processing unit 107 determines whether the user is successfully authenticated. If it is determined that the user is successfully authenticated, the protocol processing unit 107 advances to step S310. On the other hand, if it is determined that the user is not authenticated, the protocol processing unit 107 advances to step S309. The protocol processing unit 107, when receiving the information indicating that the user is successfully authenticated from the key management/authentication processing unit 118, determines that the user is authenticated.

In step S309, the protocol processing unit 107 terminates the encrypted communication session with the client apparatus and advances to step S304. On the other hand, in step S310, the protocol processing unit 107 sends a concerned power source control instruction code, among the power source control instruction codes 1204 in FIG. 8, to the power source control unit 115. The power source control unit 115, according to the power source control instruction code, performs processing for selectively powering on the hardware devices in the application system unit 103 including the system bus 109, the CPU 110, the ROM 111, the RAM 112, the application function unit A 113, and the application function unit B 114.

In steps S311 through S313, the protocol processing unit 107, while waiting until the completion of activation of the application system unit 103 is notified, performs processing for temporarily storing data in an application communication when the protocol processing unit 107 receives a packet from the client apparatus before the completion of activation of the application system unit 103.

The CPU 110 of the application system unit 103, after confirming the completion of activation of the application system unit 103, issues a notification indicating that the application system unit 103 is completely activated (activation completion notification) to the protocol processing unit 107. In step S311, the protocol processing unit 107 determines whether the protocol processing unit 107 has received the activation completion notification. If it is determined that the protocol processing unit 107 has not received the activation completion notification, the protocol processing unit 107 advances to step S312.

In step S312, the protocol processing unit 107 determines whether encrypted communication data is received from the client apparatus via the communication control unit 105. If it is determined that the protocol processing unit 107 receives encrypted communication data from the client apparatus, the protocol processing unit 107 advances to step S313. On the other hand, if it is determined that the protocol processing unit 107 does not receive encrypted communication data from the client apparatus, the protocol processing unit 107 returns to step S311.

In step S313, the protocol processing unit 107 produces application communication data by decrypting the encrypted communication data using the encryption processing unit 117 and stores the produced application communication data in the local RAM 106.

On the other hand, if it is determined in step S311 that the protocol processing unit 107 has received the activation completion notification, the processing advances to step S314. It is to be noted here that after performing the processing in step S314, the processing advances to continue to step S401 in FIG. 23, and the next processing by the protocol processing unit 107 is step S402.

Figure 23:
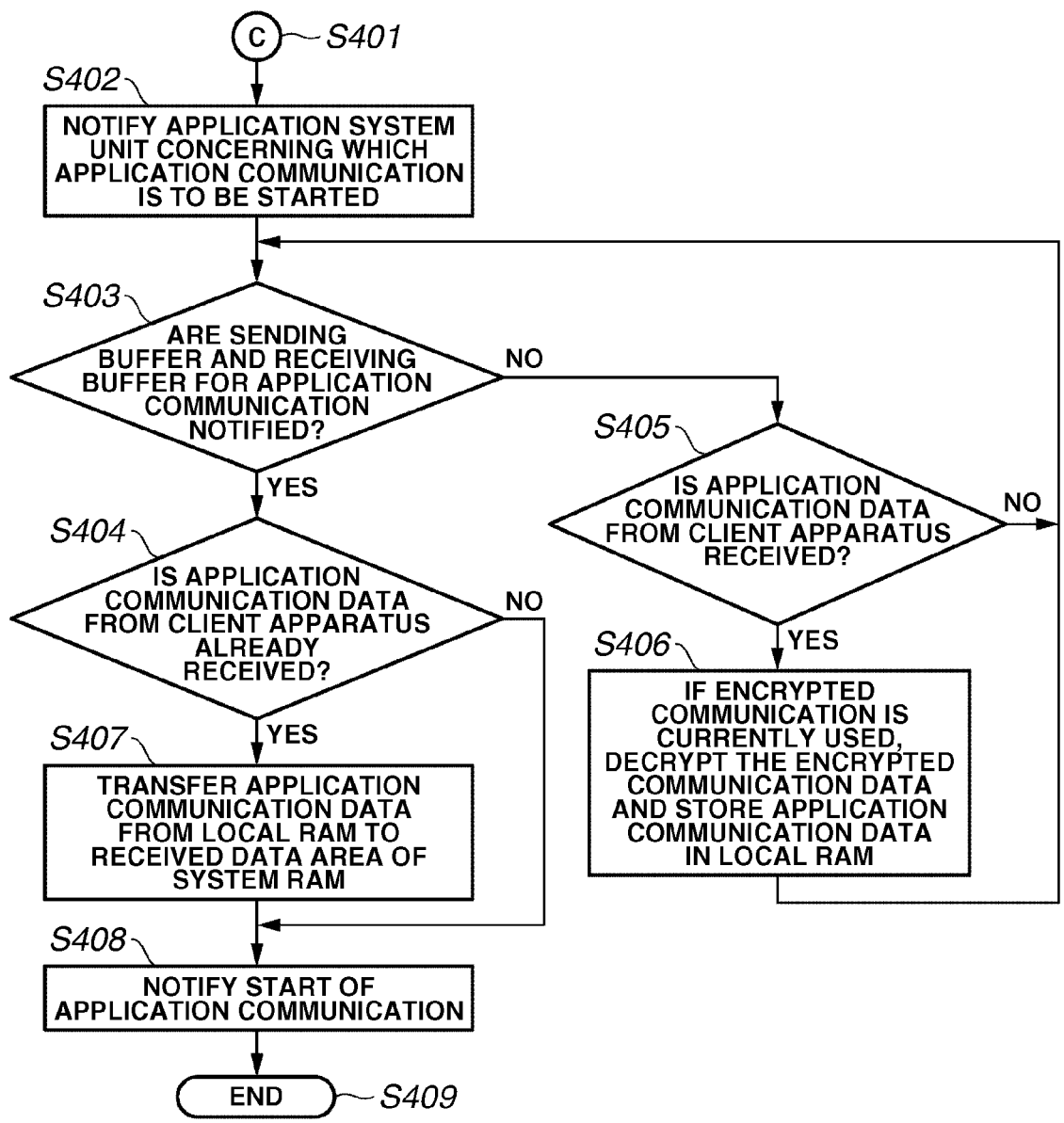
FIG. 23 is a flow chart that illustrates an example of processing performed by the protocol processing unit when the information processing apparatus is in a low power consumption state according to an exemplary embodiment of the present invention.

In the flow of processing described above, in the case where the processing advances from step S211 in FIG. 21 to step S401 in FIG. 23, the information processing apparatus 101 and the client apparatus perform a non-encrypted communication using TCP. On the other hand, in the case where the processing advances from step S314 in FIG. 22 to step S401 in FIG. 23, the information processing apparatus 101 and the client apparatus perform an encrypted communication utilizing a TCP connection and an encrypted communication session on the TCP connection.

The processing in steps S402 through S409 is similar to the processing in steps S902 through S908 in FIG. 10, and accordingly, a description thereof is omitted here. Note that when the protocol processing unit 107 is performing an encrypted communication with the client apparatus in step S406, the protocol processing unit 107 decrypts the encrypted communication data from the client apparatus using the encryption processing unit 117 so as to produce application communication data. The protocol processing unit 107 stores the produced application communication data in the local RAM 106.

Figure 24:
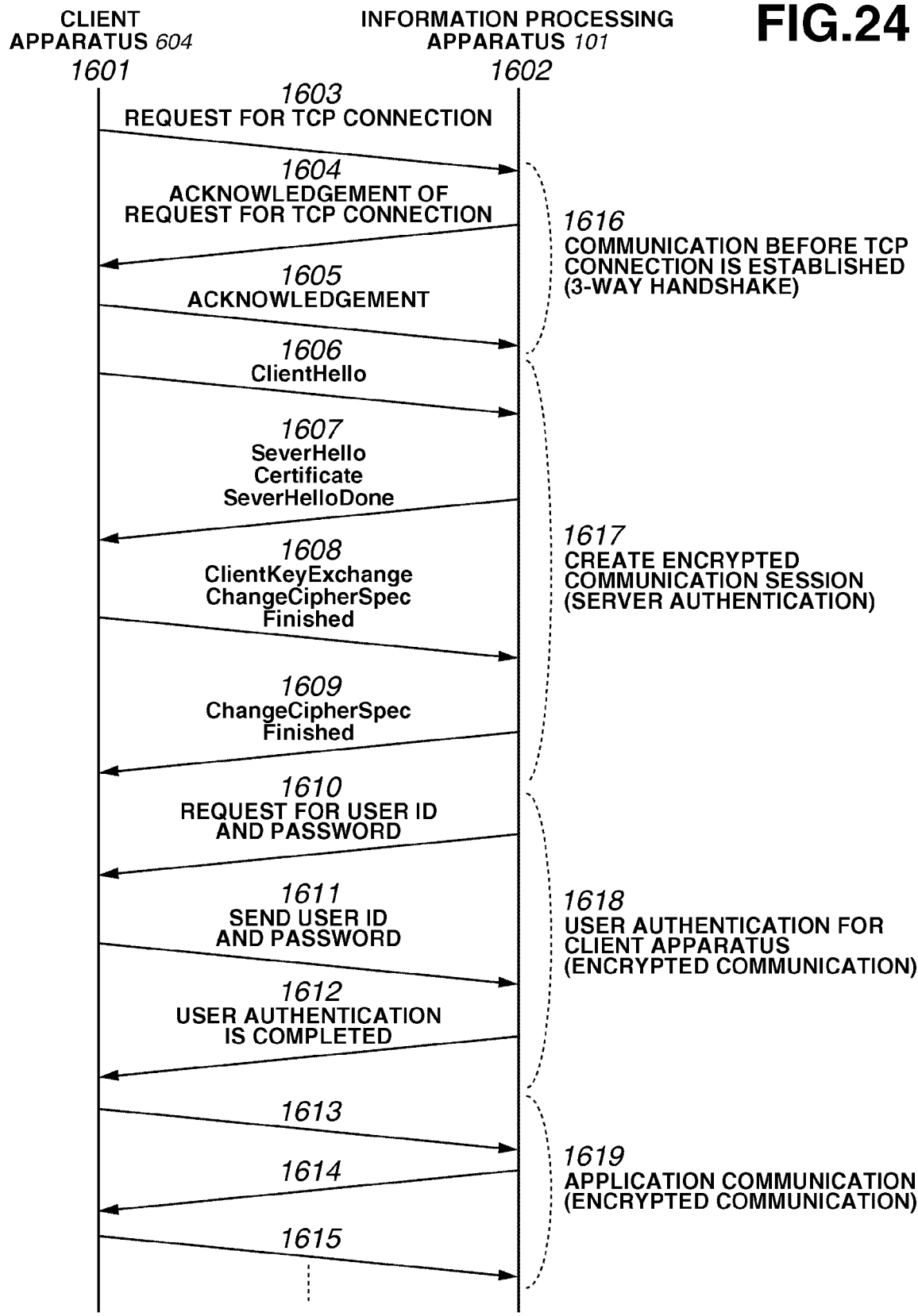
FIG. 24 illustrates an exemplary sending and receiving sequence in a normal system in an early stage after start of the application communication between the information processing apparatus and the client apparatus according to an exemplary embodiment of the present invention.
Figure 25:
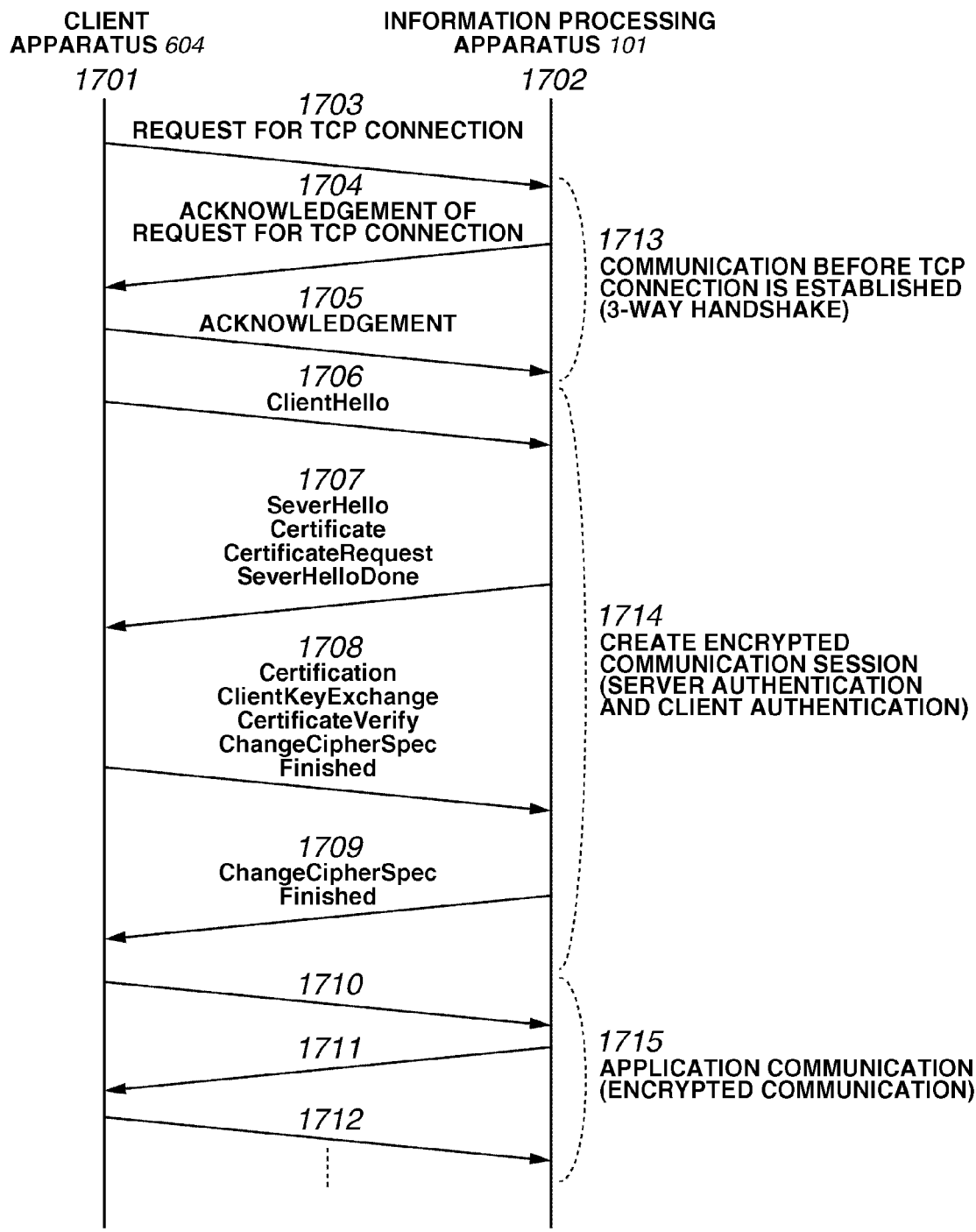
FIG. 25 illustrates an exemplary sending and receiving sequence in a normal system in an early stage after start of the application communication between the information processing apparatus and the client apparatus according to an exemplary embodiment of the present invention.
Figure 26:
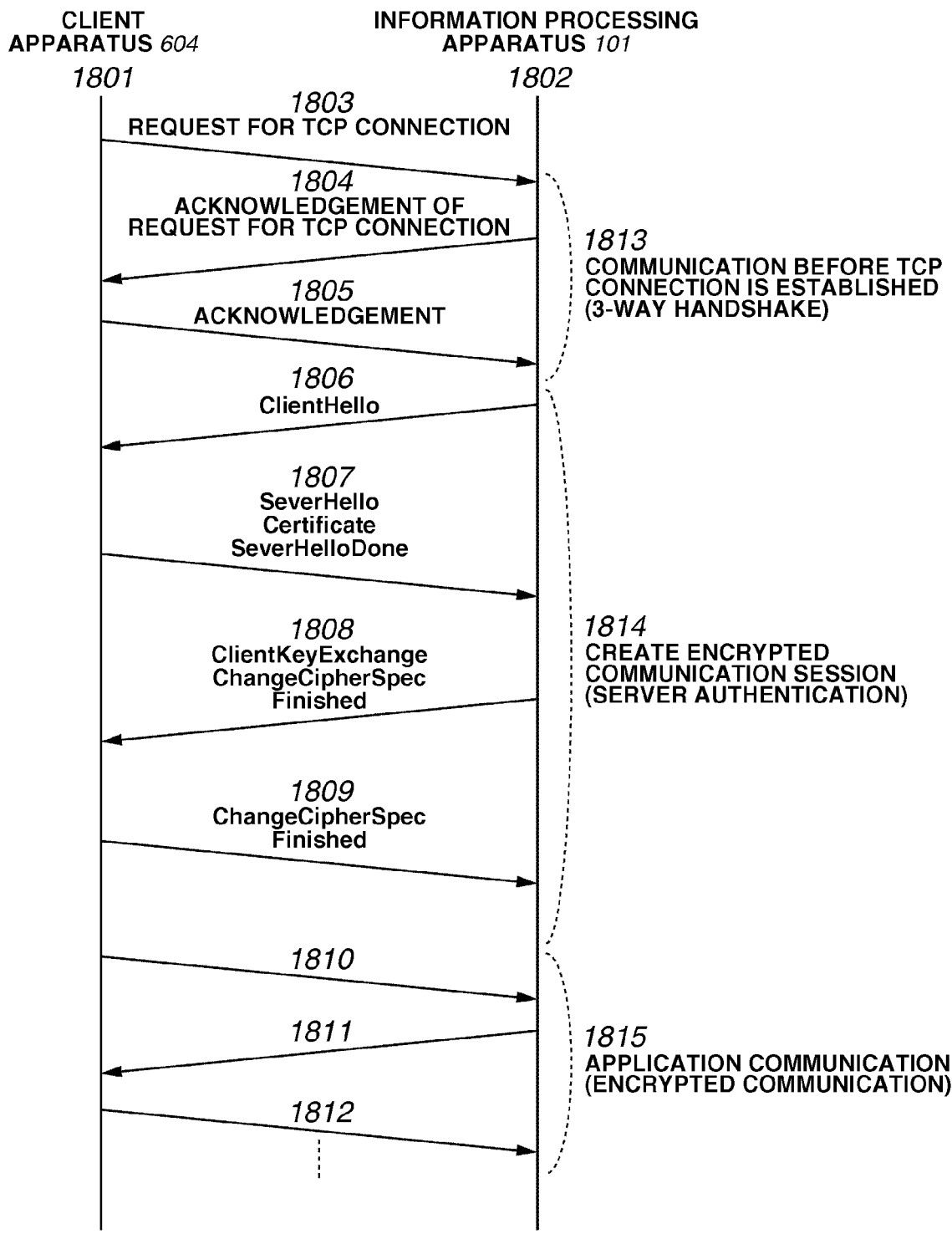
FIG. 26 illustrates an exemplary sending and receiving sequence in a normal system in an early stage after start of the application communication between the information processing apparatus and the client apparatus according to an exemplary embodiment of the present invention.

Now, a description is made as to a sending and receiving sequence in a normal system in an early stage after start of the application communication between the information processing apparatus 101 and the client apparatus with reference to FIG. 24, FIG. 25, and FIG. 26. Note that the sequence diagram illustrating a normal system communication in the case where the application communication does not require authentication of the client apparatus is similar to FIG. 13.

FIG. 24 illustrates a normal system communication sequence in the case where the application communication requires authentication of the client apparatus and an authentication method is used in which user authentication is performed after the encrypted communication is started. Referring to FIG. 24, an axis 1601 indicates a time base for the client apparatus 604 and an axis 1602 indicates a time base for the information processing apparatus 101. Arrows 1603 through 1605, which are drawn in between both time bases, indicate a communication performed for the processing by a 3-way handshake 1616. By performing this processing, a TCP connection is established between the client apparatus 604 and the information processing apparatus 101.

Arrows 1606 through 1609 indicate a communication performed by the client apparatus 604 for a negotiation 1617 with the information processing apparatus 101 for creating an encrypted communication session. The information processing apparatus 101 sends a digital certificate of the information processing apparatus 101 to the client apparatus 604 in a "Certificate" message 1607. The client apparatus 604 verifies the digital certificate, and if it is determined that the information processing apparatus 101 is a trustable apparatus, continues to perform the other processings for the negotiation.

The method of authentication of the information processing apparatus 101 by the client apparatus 604 using a digital certificate of the information processing apparatus 101 is called "server authentication" in SSL and TLS. When the negotiation for creating an encrypted communication session is completed, all the communication data sent and received thereafter is encrypted.

Then, the information processing apparatus 101, in a communication indicated by an arrow 1610, transfers to the client apparatus 604 a signal requesting sending of a user ID and a password. When the client apparatus 604 receives the signal, the client apparatus 604 sends the user ID and the password in a communication indicated by an arrow 1611. The information processing apparatus 101 performs authentication with the received user ID and password. When the client apparatus 604 is successfully authenticated, the information processing apparatus 101 notifies the client apparatus 604 of completion of user authentication in a communication indicated by an arrow 1612.

That is, arrows 1610 through 1612 indicate a communication related to user authentication 1618 of the client apparatus 604. When the user authentication of the client apparatus 604 is successfully performed, the client apparatus 604 starts a communication with the information processing apparatus 101 using an application protocol. The communications indicated by arrows 1613 through 1615 indicate an application communication 1619.

The information processing apparatus 101, in a low power consumption state, receives a request for starting an application communication from the client apparatus 604. Then, the information processing apparatus 101 performs user authentication of the client apparatus 604 and activates the application system unit 103. In this case, a communication for establishing a TCP connection indicated by an arrow 1616, a communication for negotiation at the time of creating an encrypted communication session indicated by an arrow 1617, and a communication for user authentication indicated by an arrow 1617 are performed by the network communication unit 102 only. In addition, an application communication indicated by an arrow 1619 is performed by the network communication unit 102 and the application system unit 103.

FIG. 25 illustrates a normal system communication sequence in the case where the application communication requires authentication of the client apparatus 604 and an authentication method is used in which the client apparatus is authenticated by the negotiation started by the client apparatus for creating an encrypted communication session. Referring to FIG. 25, an axis 1701 indicates a time base for the client apparatus 604 and an axis 1702 indicates a time base for the information processing apparatus 101. Arrows 1703 through 1705, which are drawn in between both time bases, indicate a communication performed for the processing by a 3-way handshake 1713, which is similar to the 3-way handshake described above. By performing this processing, a TCP connection is established between the client apparatus 604 and the information processing apparatus 101.

Arrows 1706 through 1709 indicate a communication for a negotiation 1714 with the information processing apparatus 101 started by the client apparatus 604 for creating an encrypted communication session. The information processing apparatus 101 sends a digital certificate of the information processing apparatus 101 to the client apparatus 604 in a communication 1707 including a "Certificate" message. At the same time, the information processing apparatus 101 requests the client apparatus 604 to send a digital certificate by a "CertificateRequest" message. The client apparatus 604 verifies the digital certificate of the information processing apparatus 101, and if it is determined that the information processing apparatus 101 is a trustable apparatus, continues to perform the other processings for the negotiation. As described above, this authentication is server authentication in SSL and TLS.

In a communication 1708, the client apparatus 604 sends a digital certificate of the client apparatus 604 that is requested by the information processing apparatus 101, by using a "Certificate" message. At the same time, the client apparatus 604 sends a character string certifying that a subject apparatus that sends the digital certificate is the client apparatus 604 by a "CertificateVerify" message.

The information processing apparatus 101, when receiving the communication 1708, verifies the digital certificate sent by the client apparatus 604 to perform an authentication processing for determining whether the client apparatus 604 is a trustable apparatus. If the client apparatus 604 is successfully authenticated, the information processing apparatus 101 performs a communication 1709. The method of authentication of the client apparatus 604 by the information processing apparatus 101 in which the information processing apparatus 101 requests a digital certificate of the client apparatus 604 is called "client authentication" in SSL and TLS.

When the negotiation processing 1714 for creating an encrypted communication session is completed, all the communication data sent and received thereafter is encrypted.

Then, the client apparatus 604 starts a communication with the information processing apparatus 101 using an application protocol. The communication indicated by arrows 1710 through 1712 indicates an application communication 1715.

The information processing apparatus 101, in a low power consumption state, receives a request for starting an application communication from the client apparatus 604. Then, the information processing apparatus 101 performs authentication of the client apparatus 604 at the time of negotiation started by the client apparatus 604 and performed in the course of creating an encrypted communication session, and then activates the application system unit 103.

In this case, the communication processing 1713 for establishing a TCP connection and a communication processing 1714 for negotiation performed in the course of creating an encrypted communication session are performed by the network communication unit 102 only. In addition, an application communication 1715 is performed by the network communication unit 102 and the application system unit 103.

FIG. 26 illustrates a normal system communication sequence in the case where the application communication requires authentication of the client apparatus 604 and an authentication method is used in which the client apparatus 604 is authenticated by the negotiation started by the information processing apparatus 101 for creating an encrypted communication session.

Referring to FIG. 26, an axis 1801 indicates a time base for the client apparatus 604 and an axis 1802 indicates a time base for the information processing apparatus 101. Arrows 1803 through 1805, which are drawn in between both time bases, indicate a communication performed for the processing by a 3-way handshake 1813, which is similar to the 3-way handshake described above. By performing this processing, a TCP connection is established between the client apparatus 604 and the information processing apparatus 101.

Arrows 1806 through 1809 indicate a communication for a negotiation 1814 with the client apparatus 604 started by the information processing apparatus 101 for creating an encrypted communication session. The client apparatus 604 sends a digital certificate of the client apparatus 604 to the information processing apparatus 101 in a communication 1807 including a "Certificate" message. The information processing apparatus 101 verifies the digital certificate of the client apparatus 604, and if it is determined that the client apparatus 604 is a trustable apparatus, continues to perform the other processings for the negotiation. As described above, this authentication is server authentication in SSL and TLS.

When the negotiation processing 1814 for creating an encrypted communication session is completed, all the communication data sent and received thereafter is encrypted. Then, the client apparatus 604 starts a communication with the information processing apparatus 101 using an application protocol. The communication indicated by arrows 1810 through 1812 indicates an application communication 1815.

The information processing apparatus 101, in a low power consumption state, receives a request for starting an application communication from the client apparatus 604. Then, after the client apparatus 604 is authenticated in the course of the negotiation started by the information processing apparatus 101 for creating an encrypted communication session, the information processing apparatus 101 activates the application system unit 103. In this case, a communication processing 1813 for establishing a TCP connection and a communication processing 1814 for negotiation performed in the course of creating an encrypted communication session are performed by the network communication unit 102 only. In addition, an application communication 1815 is performed by the network communication unit 102 and the application system unit 103.

Note that in FIG. 26, after the processing 1813 for establishing a TCP connection, the information processing apparatus 101 starts a negotiation 1814 with the client apparatus 604 for creating an encrypted communication session. However, the configuration is not limited to this. That is, the method can be arranged such that first, the client apparatus 604 sends a notification requesting an encrypted communication, and then, using the notification as a trigger, the information processing apparatus 101 starts a negotiation with the client apparatus 604 for creating an encrypted communication session.

According to the present exemplary embodiment, the information processing apparatus 101, while no application communication is performed by the information processing apparatus 101, causes the network communication unit 102 to operate and powers off the hardware devices in the application system unit 103 except for the power source control unit 115. Thus, a low power consumption state can be implemented.

In addition, the network communication unit 102 operates even while the information processing apparatus 101 does not perform an application communication. Accordingly, the information processing apparatus 101 can receive a request for an application communication from a client apparatus.

In addition, according to the present exemplary embodiment, the request for starting an application communication is determined to be received when a TCP packet whose destination port number used for starting a TCP communication connection is any of receiving port numbers per each application communication. Thus, when authentication of the client apparatus is not required, the information processing apparatus 101 can be remotely activated by a standard TCP/IP protocol communication, and no special unit is required.

On the other hand, when authentication of the client apparatus 604 is required, the network communication unit 102 creates an encrypted communication session to authenticate the client apparatus 604, and when the client apparatus 604 is successfully authenticated, powers on the application system unit 103. Thus, when the client apparatus 604, which requests a start of an application communication, is not authenticated, a low power consumption state of the information processing apparatus 101 can be maintained. Accordingly, power saving can be implemented more effectively.

Fourth Exemplary Embodiment

Now, a fourth exemplary embodiment of the present invention is described. In the fourth exemplary embodiment, a description is made as to an example in which a network camera 1401 is used as an example of the information processing apparatus 101 described in the third exemplary embodiment. Note that in the fourth exemplary embodiment, a description is made primarily as to points different from the second exemplary embodiment, and points similar to the second exemplary embodiment are not described here.

Figure 27:
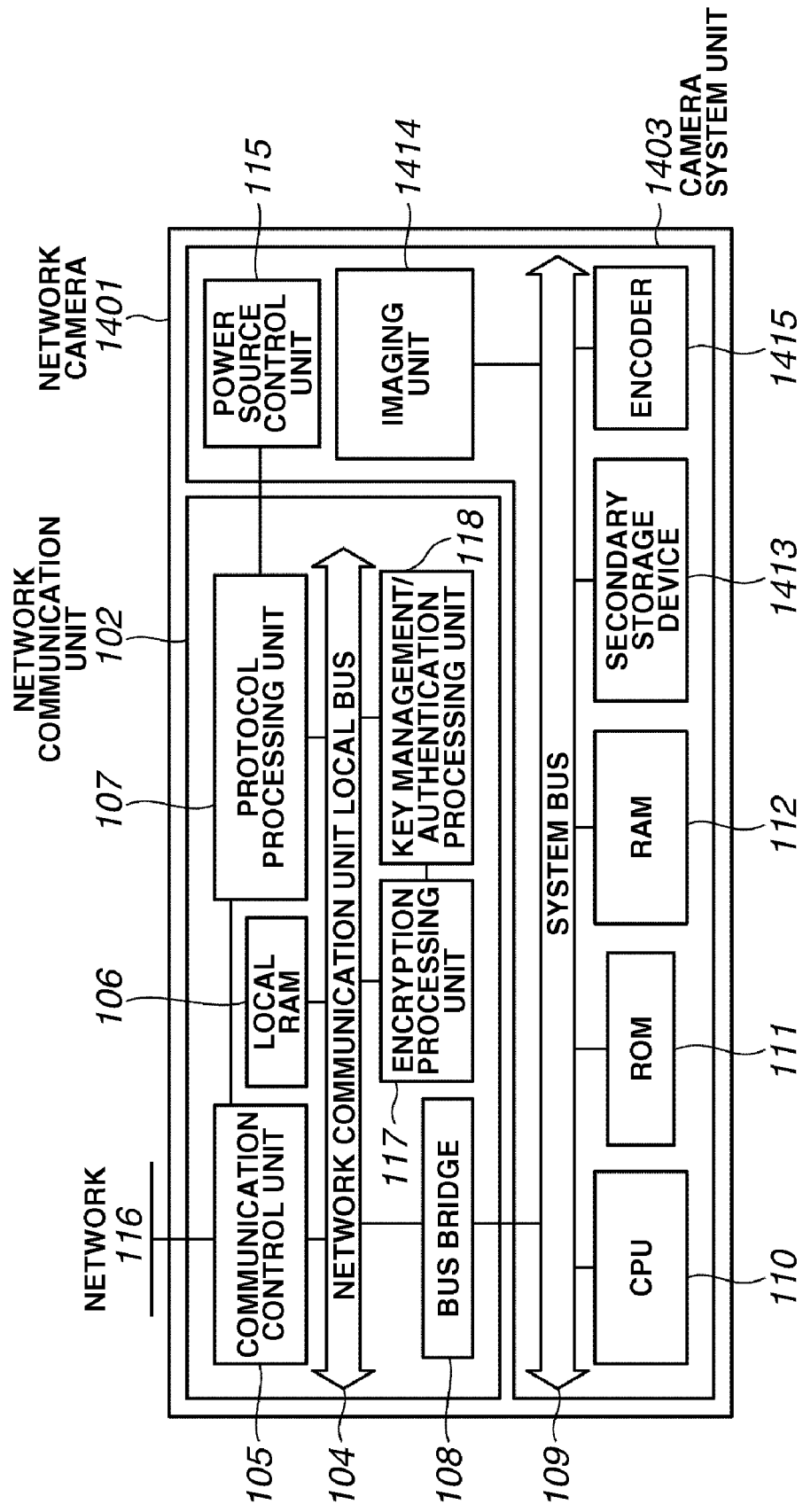
FIG. 27 illustrates an example of a network camera according to an exemplary embodiment of the present invention.

FIG. 27 illustrates an example of a network camera. Referring to FIG. 27, the network camera 1401 includes a network communication unit 102 and a camera system unit 1403. A point of the configuration shown in FIG. 27 different from the configuration shown in FIG. 14 described in the second exemplary embodiment is that the network communication unit 102 further includes an encryption processing unit 117 and a key management/authentication processing unit 118.

FIG. 28 illustrates an example of a table 2007 that indicates association data stored by the protocol processing unit 107. Referring to FIG. 28, portions and units that are similar to those in FIG. 19 are provided with the same reference numerals, and a description thereof is omitted here.

In the table 2007, it is indicated that when the TCP port number that the network camera 1401 receives is "5963", for example, the content of the application communication includes a streaming distribution of a video photographed by the network camera 1401 and a remote operation of the camera.

In addition, it is indicated that the application protocol used in the streaming distribution and the remote operation of the camera is a unique application protocol. In addition, it is indicated in the table 2007 that authentication of the client apparatus is required for performing the application communication and that the method of authentication is the client authentication in SSL and TLS.

In addition, in the table 2007, when the TCP port number is "5963" and the network camera 1401 is restored from a low power consumption state, the protocol processing unit 107 sets a power source control instruction code "0x81" to the power source control unit 115. Here, the hardware devices that the power source control unit 115 powers on to activate according to the power source control instruction code "0x81" are a system bus 115, a CPU 110, a ROM 111, a RAM 112, an imaging unit 1414, and an encoder 1415.

According to each exemplary embodiment described above, an amount of power consumption can be reduced and restoration from the low power consumption state can be safely performed according to a request from another apparatus connected via a network, with a simple configuration.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-001375 filed Jan. 6, 2006, which is hereby incorporated by reference herein in its entirety.

What is claimed:

1. An information processing apparatus comprising:
    a communication device that communicates with a client apparatus via a network, and has a first memory;
    an application system device that implements a previously installed plurality of application functions, and has a second memory;
    a management device that associates and manages application communication for the application functions implemented by the application system device and a port number for receiving the application communication;
    a power controller that, if the communication device receives a packet addressed to the information processing apparatus from the client apparatus and the received packet is a request for starting connection between the information processing apparatus and the client apparatus and designates the port number managed by the management device when the application system device is in a low power consumption state, restore the application system device from the low power consumption state to a normal power consumption state,
    wherein the communication device stores the application communication data in the first memory when the communication device receives the application communication data from the client apparatus during a period from when the power controller instructs restoration of the application system device to the normal power consumption state and to when the restoration of the application system to the normal power consumption state is completed, and the communication device transfers the application communication data stored in the first memory to the second memory of the application system device when the restoration of the application system device to the normal power consumption state is completed.

2. The information processing apparatus according to claim 1, wherein the management device associates and manages the port number, the application communication and a protocol for performing the application communication as setting information.

3. The information processing apparatus according to claim 2,
    wherein the setting information further includes activation target information on hardware devices included in the application system device,
    wherein the power controller determines a hardware device to be activated included in the application system device based on the setting information and the port number of a port receiving the request for starting a communication performed by the application system device from the client apparatus.

4. The information processing apparatus according to claim 2,
    wherein the communication device further comprises an authentication device that authenticates the client apparatus,
    wherein, after authentication is successfully performed according to an authentication method corresponding to the request for starting a communication, the power controller restores the application system device from the low power consumption state to the normal power consumption state.

5. The information processing apparatus according to claim 4,
    wherein the setting information further includes authentication method information about an authentication method,
    wherein the power controller determines an authentication method based on the authentication method information and the port number of a port receiving the request for starting a communication performed by the application system device from the client apparatus.

6. The information processing apparatus according to claim 1, wherein the application system device includes a hardware device that controls a camera.

7. A power state restoration method for an information processing apparatus including a communication device that performs a communication with a client apparatus via a network having a first memory, and an application system device that implements a previously installed plurality of application functions having a second memory, the method comprising:
    associating and managing the application communication for the application functions implemented by the application system and a port number for receiving the application communication,
    when the application system device is in a low power consumption state, the communication device receives a packet addressed to the information processing apparatus from the client apparatus and the received packet is a request for starting connection between the information processing apparatus and the client apparatus and designate the port number managed by the management device; and responsive to receiving the packet, restoring the application system device from the low power consumption state to a normal power consumption state, wherein the communication device stores the application communication data in the first memory when the communication device receives the application communication data from the client apparatus during a period from when the power controller instructs restoration of the application system device to the normal power consumption state and to when the restoration of the application system to the normal power consumption state is completed, and the communication device transfers the application communication data stored in the first memory to the second memory of the application system device when the restoration of the application system device to the normal power consumption state is completed.

8. The power state restoration method according to claim 7, further comprising, performing authentication on the client apparatus; and after authentication is successfully performed on the client apparatus according to an authentication method corresponding to the request for starting a communication, restoring the application system device from the low power consumption state to the normal power consumption state.

9. The power state restoration method according to claim 7, wherein the application system device includes a hardware device that controls a camera.

* * * * *